US009134875B2

(12) United States Patent
Falaki et al.

(10) Patent No.: US 9,134,875 B2
(45) Date of Patent: *Sep. 15, 2015

(54) ENHANCING PUBLIC OPINION GATHERING AND DISSEMINATION

(71) Applicant: VoteBlast, Inc., West Hollywood, CA (US)

(72) Inventors: Ardeshir Falaki, West Hollywood, CA (US); Earl A. Oliver, Waterloo (CA)

(73) Assignee: VoteBlast, Inc., West Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/244,776

(22) Filed: Apr. 3, 2014

(65) Prior Publication Data
US 2014/0223329 A1 Aug. 7, 2014

Related U.S. Application Data

(63) Continuation-in-part of application No. 13/070,201, filed on Mar. 23, 2011, now Pat. No. 8,732,605.

(60) Provisional application No. 61/316,535, filed on Mar. 23, 2010.

(51) Int. Cl.
*G06F 15/00* (2006.01)
*G06F 13/00* (2006.01)
*G06F 3/048* (2013.01)

(52) U.S. Cl.
CPC ............... *G06F 3/048* (2013.01); *G06F 13/00* (2013.01); *G06F 15/00* (2013.01)

(58) Field of Classification Search
CPC ................................ G06F 3/038; G06F 13/00
USPC .......... 715/711, 780, 790, 808, 851, 853, 733
See application file for complete search history.

(56) References Cited

U.S. PATENT DOCUMENTS

| 5,581,800 | A  | 12/1996 | Fardeau et al. |
| 5,612,729 | A  | 3/1997  | Ellis et al. |
| 5,621,454 | A  | 4/1997  | Ellis et al. |
| 5,740,035 | A  | 4/1998  | Cohen et al. |
| 5,764,763 | A  | 6/1998  | Jensen et al. |
| 5,787,334 | A  | 7/1998  | Fardeau et al. |
| 6,035,177 | A  | 3/2000  | Moses et al. |
| 6,421,445 | B1 | 7/2002  | Jensen et al. |
| 6,421,724 | B1 | 7/2002  | Nickerson et al. |
| 6,606,581 | B1 | 8/2003  | Nickerson et al. |
| 6,785,717 | B1 | 8/2004  | Nickerson et al. |
| 6,871,180 | B1 | 3/2005  | Neuhauser et al. |

(Continued)

OTHER PUBLICATIONS

*In re Ochiai*, 71 F.3d 1565, 1572 (Fed. Cir. 1995), 9 pages.

(Continued)

*Primary Examiner* — Kevin Nguyen
(74) *Attorney, Agent, or Firm* — Rutan & Tucker, LLP

(57) ABSTRACT

A system to conduct a public-initiated opinion poll on a media space or in a consumer space is discussed. Simple activation of software- or hardware-based buttons or otherwise by speaking into or tapping on a device are provided and enables the public to express its likes/dislikes about anything, anyone, anywhere, anytime and merely when he/she decides to do so. Hence, this system replaces the current survey-based paradigm in which the surveyor decides when to ask what, and how from the public.

12 Claims, 17 Drawing Sheets

(56) References Cited

U.S. PATENT DOCUMENTS

| | | | |
|---|---|---|---|
| 6,928,392 B2 | 8/2005 | Nickerson et al. | |
| 7,085,820 B1 | 8/2006 | Nickerson et al. | |
| 7,248,777 B2 | 7/2007 | Feininger et al. | |
| 7,316,025 B1 | 1/2008 | Aijala et al. | |
| 7,319,863 B2 | 1/2008 | Engstrom et al. | |
| 7,343,615 B2 | 3/2008 | Nelson et al. | |
| 7,370,285 B1 | 5/2008 | Nickerson et al. | |
| 7,386,473 B2 | 6/2008 | Blumenau | |
| 7,421,628 B2 | 9/2008 | Wright et al. | |
| 7,421,723 B2 | 9/2008 | Harkness et al. | |
| 7,451,092 B2 | 11/2008 | Srinivasan | |
| 7,460,684 B2 | 12/2008 | Srinivasan | |
| 7,466,742 B1 | 12/2008 | Srinivasan | |
| 7,466,844 B2 | 12/2008 | Ramaswamy et al. | |
| 7,478,121 B1 | 1/2009 | Nickerson et al. | |
| 7,809,602 B2* | 10/2010 | Nickerson et al. | 705/7.29 |
| 7,827,487 B1 | 11/2010 | Nickerson et al. | |
| 7,865,455 B2 | 1/2011 | Nickerson et al. | |
| 8,001,008 B2* | 8/2011 | Engle | 705/26.62 |
| 8,732,605 B1 | 5/2014 | Falaki | |
| 2003/0009555 A1 | 1/2003 | Nickerson et al. | |
| 2004/0019688 A1 | 1/2004 | Nickerson et al. | |
| 2004/0049417 A1 | 3/2004 | Nickerson et al. | |
| 2004/0049534 A1 | 3/2004 | Nickerson et al. | |
| 2005/0240618 A1 | 10/2005 | Nickerson et al. | |
| 2006/0248188 A1 | 11/2006 | Nickerson et al. | |
| 2006/0265368 A1 | 11/2006 | Nickerson et al. | |
| 2007/0288476 A1 | 12/2007 | Flanagan et al. | |
| 2008/0010110 A1 | 1/2008 | Neuhauser et al. | |
| 2008/0033790 A1 | 2/2008 | Nickerson et al. | |
| 2008/0059286 A1 | 3/2008 | Nickerson et al. | |
| 2008/0086304 A1 | 4/2008 | Neuhauser et al. | |
| 2008/0086533 A1 | 4/2008 | Neuhauser et al. | |
| 2008/0091087 A1 | 4/2008 | Neuhauser et al. | |
| 2008/0091451 A1 | 4/2008 | Crystal et al. | |
| 2008/0091762 A1 | 4/2008 | Neuhauser et al. | |
| 2008/0109295 A1 | 5/2008 | McConochie et al. | |
| 2009/0083264 A1 | 3/2009 | Nickerson et al. | |
| 2009/0083654 A1 | 3/2009 | Nickerson et al. | |
| 2012/0046936 A1* | 2/2012 | Kandekar et al. | 704/9 |

OTHER PUBLICATIONS

*Ex Parte* Wada and Murphy, U.S. Patent and Trademark Office Board of Patent Appeals and Interferences Decision on Appeal for Appeal No. 2007-3733 dated Jan. 14, 2008, 9 pages. Alexandria, Virginia USA.

Webpage for Yelp, http://www.yelp.com/, San Francisco Restaurants, Dentists, Bars, Beauty Salons, Doctors, Jun. 27, 2011, 1 page.

Webpage for Crimson, http://www.crimsonhexagon.com/, Crimson Hexagon: Social Media Monitoring and Analysis, Jun. 27, 2011, 1 page.

Webpage for Gallup, http://www.gallup.com/home.aspx, Gallup. com—Daily News, Polls, Public Opinion on Government, Politics, Jun. 27, 2011, 3 pages.

Non-Final Office Action for U.S. Appl. No. 13/070,201, mailed May 24, 2013, 12 pages. U.S. Patent and Trademark Office, Alexandria, Virginia USA.

Notice of Allowance U.S. Appl. No. 13/070,201, mailed Dec. 23, 2013, 6 pages. U.S. Patent and Trademark Office, Alexandria, Virginia USA.

* cited by examiner

No SIM 🛜     6:15 PM     ✈ ✱ 🔋⚡

Cancel     Update topic     Done

Change the image for this topic?

Stanford Grill

At Stanford Grill we take pride in our meat! We have the best steaks in town! Try our New York steak accompanied by a
158/160 our amazing, award winning Stanford University, 186-1...

Location: 43.452, -80.557

Social networking

ENHANCING PUBLIC OPINION GATHERING AND DISSEMINATION

RELATED APPLICATIONS

This application is a continuation in part and claims the benefit of US patent application titled "VARIOUS METHODS AND APPARATUS FOR ENHANCING PUBLIC OPINION GATHERING AND DISSEMINATION", Ser. No. 13/070,201, filed Mar. 23, 2011, which is a Continuation in Part application and claims the benefit of US Provisional Patent Application titled "VARIOUS METHODS AND APPARATUS FOR ENHANCING PUBLIC OPINION GATHERING AND DISSEMINATION", Ser. No. 61/316,535, filed Mar. 23, 2010, both of which are hereby incorporated by reference.

NOTICE OF COPYRIGHT

A portion of the disclosure of this patent document contains material that is subject to copyright protection. The copyright owner has no objection to the facsimile reproduction by anyone of the interconnect as it appears in the U.S. Patent and Trademark Office Patent file or records, but otherwise reserves all copyright rights whatsoever.

FIELD

An aspect of an embodiment relates to an intelligent way to allow the public/users to initiate a survey/opinion poll that can be aggregated and categorized.

BACKGROUND

In the past, most of the opinion systems were either survey-based, in which the questionnaire decides what opinions are expressed, or if user-initiated, the user expresses his/her opinion in text and almost free format which mostly can lead to many opinions being expressed in multiple sentences, or paragraphs, making them hard to search, specifics mixed hidden in broad terms, difficult to analyze or compare, etc. In cases where a quantized method was used (e.g., numbered rating), the subject was pre-selected and then provided to the user, hence limiting the user's ability to very specifically select a subject.

SUMMARY OF THE INVENTION

An opinion polling system is described. In an embodiment, the system conducts a public-initiated opinion poll on a media space or in a consumer space. 1) Simple activation of software- or hardware-based opinion level buttons or otherwise 2) by speaking into or 3) by tapping on a device are provided, which enable the public to express its likes/dislikes about anything, anyone, anywhere, anytime and merely when he/she decides to do so. Hence, this system replaces the current survey-based paradigm in which the surveyor decides when to ask, what to ask on, and how from the public.

In an embodiment, an application resident on the client device communicates over a network with a server and database. This client device-server system is configured to enable a user of the client device to conduct a public-initiated opinion poll to express 1) likes, 2) dislikes or 3) any combination of the two about anything, anyone, anywhere, and anytime. A module, such as an application on the mobile device or resident on the server, may be configured to present a template for the opinion poll to allow greater specificity and user customizing of the opinion poll to the user of the client device initiating this opinion poll. A user interface of the module presents a subject field on a display screen of the client device. The server may be configured to recognize content in the subject field as choosing and setting the subject matter of the opinion poll. The content of the subject field is solely initiated and decided by the user and not pre-selected by a third party and then presented to the user of the client device to give their opinion about that pre-selected subject matter of the opinion poll. The user interface and subject field are configured to enable the user of the client device to select an overall subject and even specific features of that subject, which the user wishes to create the opinion poll on. The module is configured to enable the user of the client device to choose when to express his/her opinion, exactly about what subject matter to express his/her opinion on, and then to express his/her opinion level by activating/pressing a single opinion level button that has a very specific meaning.

The client device communicates the content entered into the subject field of the user interface to set the name and subject matter of the opinion poll over the network to the server potentially located on the World Wide Web. A software program resident on the server takes in the details of the opinion poll. The backend server aggregates the opinion level expressed by activating/pressing the opinion level button with all of the cast opinion levels previously submitted by users of different client machines on this opinion poll and feeds this information back to the client device to be displayed on a display screen of the client device as well as feeds this information back to providers/paying customers.

In an exemplary embodiment, an apparatus for a public-initiated opinion poll, includes a software system comprising a server that communicates over a network such as the Internet (web) or an intranet, with a client such as a smartphone application (app), a web browser, or a software program running on any network appliance or computer. The software server is configured to present one or more screens, pages, or data otherwise intended for a user to the software resident on the client. The software server is configured to receive a search query input in a search field from the client application, such as a browser, or other software resident on the client device regarding the public-initiated opinion poll, or anything else in which the user is interested. The server is configured to cooperate with a database. The client application has a search module configured to complement a 'Search' function with an 'Add' function to the database. The search module on the server has an engine that parses the user input in the search field and then figures out the search topic and sends an inquiry to the database. The database is searched for an entity, or entities, exactly or approximately matching the subject of the search. The search module is configured to add a database entry on a search query, if and when the search result is not found in the database. The module adds the topic of the unsuccessful search to the database that was searched such that in subsequent searches the topic will exist. The search module both reads data in the database in response to the search query and can write data entries into the database; thereby, modifying or enhancing the database as the search algorithm of the module is searching when topics of the search are not found in the database. The database entry for the subject of the search is stored along with metadata obtained with that query such as the geographic location of the client making the search, user demographics, the IP address; etc.

In another exemplary embodiment, an apparatus, includes a software system consisting of a server that communicates over a network such as the Internet (web) or an intranet, with a client, such as a smartphone application (app), a web browser, or a software program, running on any network appliance. The client software is configured to present one or more screens, pages, or data otherwise intended for a user to the software resident on the client. The software is configured to enable a user of the client to create and convey opinions on a public-initiated opinion poll to express 1) likes, 2) dislikes or 3) any combination of the two, as well as to further elaborate on the opinion by entering text, or other graphical inputs, about anything, anyone, anywhere, anytime. The server has a module to geographically verify both a location of the client and a location attribute of a geographic location associated with a topic of the public-initiated opinion poll. The server is configured to cooperate with the client application, browser or other application, on the client device that cooperates with a module on the client device that tracks the client's geographic location to supply the client's geographic location. The software server couples i) the client application's configured ability to allow the user to create or convey actions for the opinion poll to ii) the geographic location of the client at the time of the action, requiring that the geographic location of the client and a geographic attribute associated with the topic of the opinion poll, such as GPS coordinates, match within a defined proximity, or else disallowing the user of the client application from taking a specific action in the context of opinions, reviews, polls, surveys, and ratings. This configuration guarantees no one, other than people at a specific given location, can participate in the polls, surveys, ratings, writing reviews, etc. about that specific location.

In another exemplary embodiment, an apparatus for a public-initiated opinion poll, includes a software system consisting of a server, that communicates over a network such as the Internet (web) or an intranet, with a client such as a smartphone application (app), a web browser, or a software program running on any network appliance or computer, where the client is configured to receive an input from a machine-read code in a field from an application or browser resident on the client regarding the public-initiated opinion poll; where the server is configured to cooperate with a database; where the database has both a pool of assigned codes associated with their own opinion poll, a pool of blank database entries associated with reserved codes available to be associated with a future topic, where each code is unique from the other bar codes, where the client has a code reader module configured to facilitate quick access to an opinion topic stored in the database based on the unique code, where the code reader module is configured to change an indicated status of a code when a first code from the pool of reserved codes is assigned to its own opinion poll and would now be in the pool of assigned codes.

In an exemplary embodiment, an apparatus for a public-initiated opinion poll, includes web service resident on a server configured to communicate over a network, such as the Internet (web) or an intranet, with a client application, such as a smartphone application (app), a web browser, or a software program, resident on a network appliance, such as a computer, smart phone, laptop, tablet, or other client device. The web service is configured to receive an input from an application resident on the client application regarding the public-initiated opinion poll. The server is configured to cooperate with a database. The database has both a pool of known users of the web service associated with their own web service identifier and account at the web service and a set of tracked actions regarding each unknown/anonymous users of the web service who are anonymous and not associated with a known account at the web service. The web service is configured to allow anonymous users to create opinion topics as well as express opinions on existing opinion topics and those are the tracked actions regarding that unknown/anonymous user. A tracking module of the web service cooperates with the database to maintain the association of topics and opinions supplied from each anonymous user, while preserving the user's anonymity until that user decides to create an account on the web service. The tracking module then causes the topics and opinions supplied from the anonymous user to be moved into the user's account in the database.

BRIEF DESCRIPTION OF THE DRAWINGS

The multiple drawings refer to example embodiments of the invention.

Figure 1:
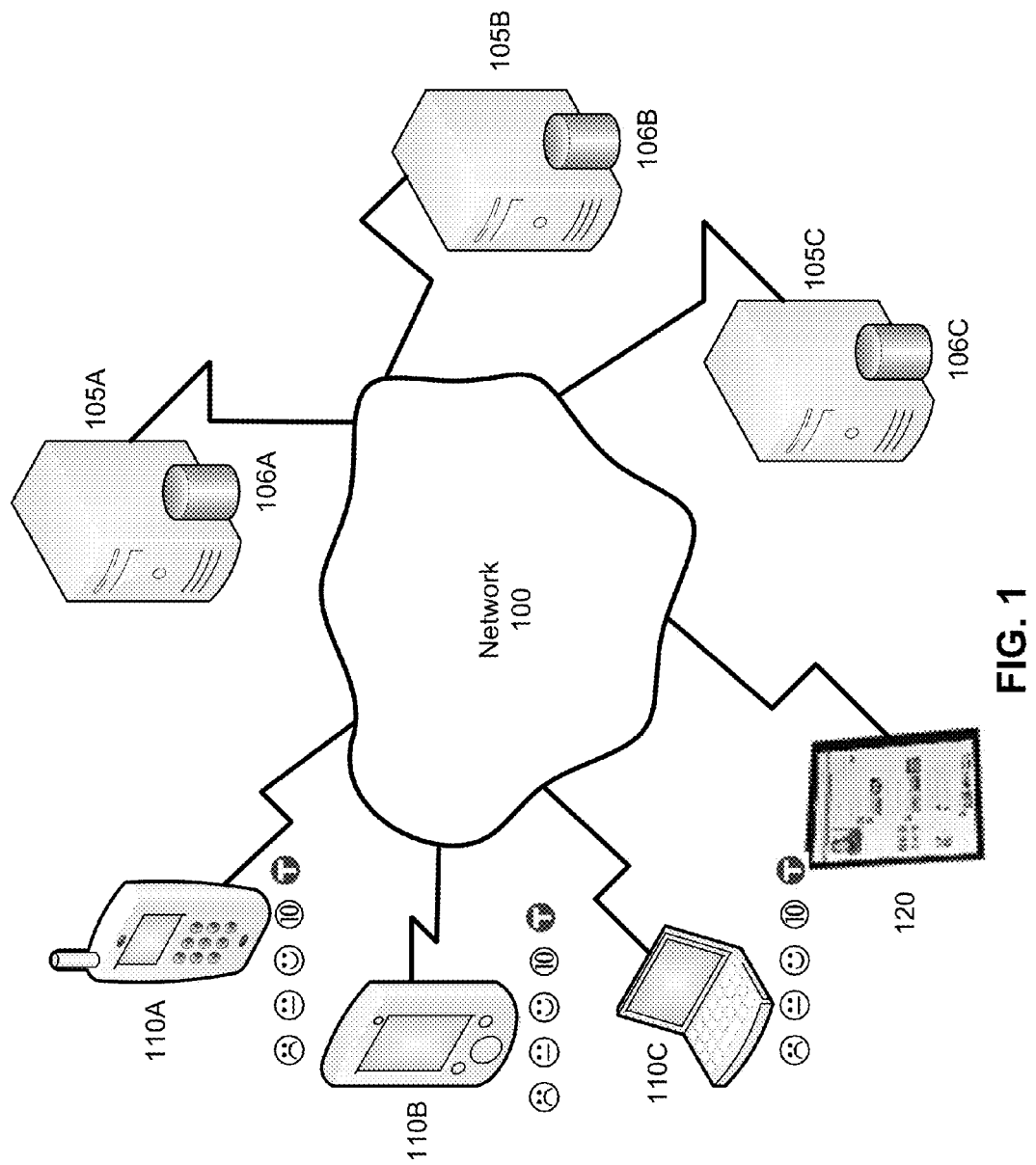
FIG. 1 illustrates a diagram of an embodiment of a client-server network environment to implement the user-initiated opinion polling system.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific routines, named components, connections, internet opinion polling technology, etc., in order to provide a thorough understanding of the present invention. It will be apparent, however, to one skilled in the art that the present invention may be practiced without these specific details. In other instances, well-known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention. Multiple embodiments will be discussed and it is understood by the inventors of this application that features of a first embodiment may also be implement another embodiment.

FIGS. 1-7b illustrate exemplary embodiments of systems and methods that enable a user of a client device to conduct a public-initiated opinion poll to express 1) likes, 2) dislikes or 3) any combination of the two about anything, anyone, anywhere, anytime. A module is configured to present a template for the opinion poll to allow greater specificity and user customizing of the opinion poll to the user of the client device initiating this opinion poll, and the client device communicates the content entered into the subject field of the user interface to set a name and subject matter of the opinion poll. Complementing a 'Search' Function with an 'Add' Function In a generic search, for example as shown in FIG. 8, if the topic/subject of a query is not found in the database that was searched, the search function returns a 'search unsuccessful' message, sometimes referred to as a 'null', and the search process is deemed completed for the said topic/subject, and the database is left unaffected.

Typically, a database is merely searched, such that outside reviewers are limited and prevented in the ability to add new entries into the database system. This is typically because the database owner and the reviewers are unrelated entities and the reviewer/searcher does not have the same incentives to maintain the integrity of the data entered in to the database. The reviewer/searcher merely wants to retrieve the information from the database.

Figure 9:
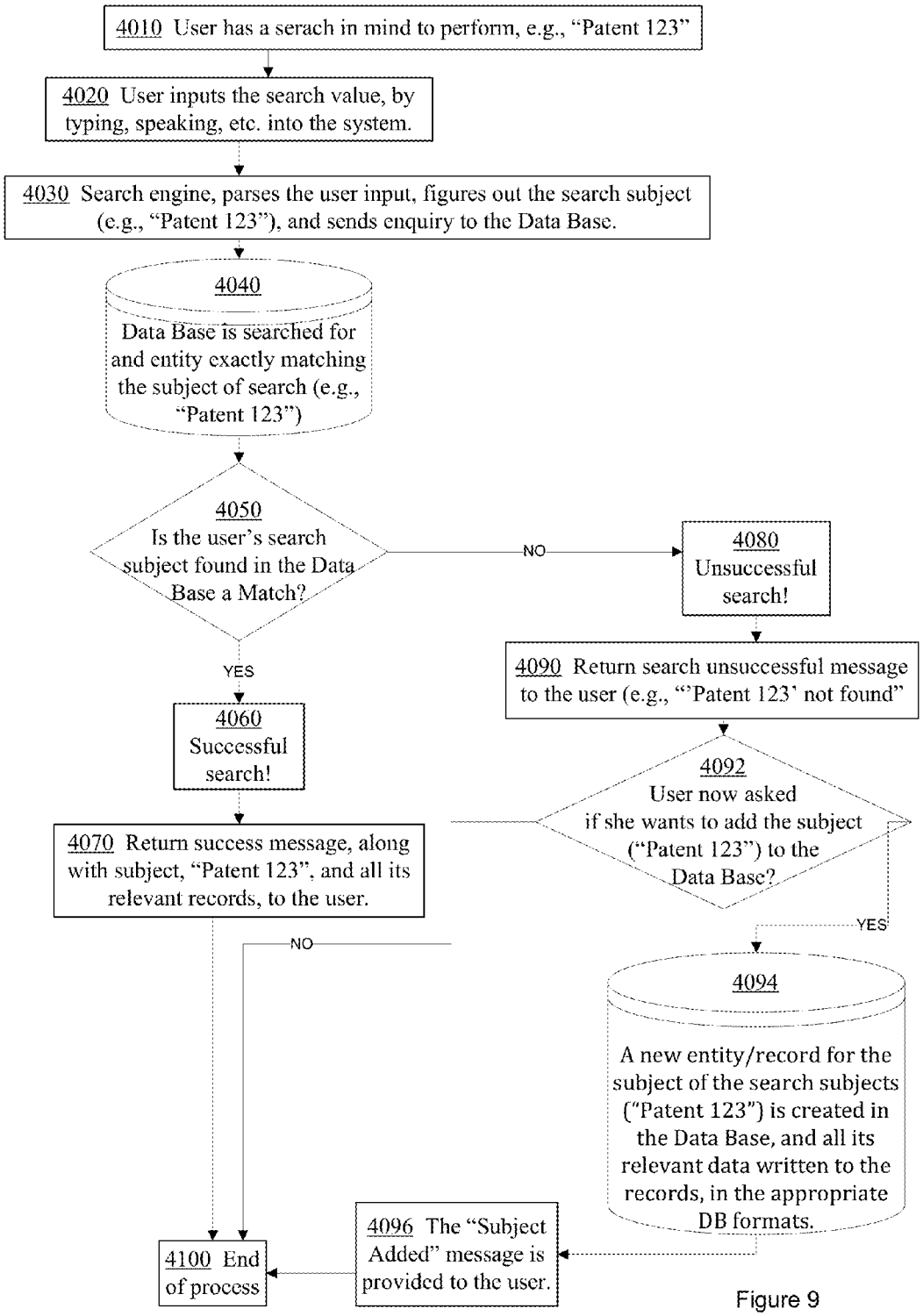
FIG. 9 illustrates an exemplary search and add algorithm according to embodiments described herein.

In an exemplary embodiment, as illustrated in FIG. 9, 'Search/Add', all existing and traditional functions of the search function, as described above, may exist; however, if/when the search result is 'null' or 'subject/topic not found', then the process will continue and the 'Add' function will properly add the subject/topic of the unsuccessful search to the database that was searched. Accordingly, in subsequent searches, the topic/subject will exist, hence be found. Therefore, a 'Search/Add' function, unlike a 'Search' function, both reads and possibly writes to a database, modifying/enhancing the database it is searching, when topics/subjects of the search are not found in the database.

If a search of a subject or topic initiated by the user, by typing in the search box and pressing the 'Search/Add' icon, and queried from the database by the search engine, does not return an exact match, then by pressing the 'Search/Add' icon, or tab, a second time, or pressing another icon for 'Add' or '+', which may also have been provided, the search topic is automatically added to the database. The search topic is added such that the next time a user searches for the said topic, and the search engine initiates a query for that topic, the search query function will in fact find the recently added entity to/in the database, and return it as the search match result. This function, in essence, enables the user of any database that supports this search/add function, to not only read the database, but also write to and modify it, hence expanding and completing its content dynamically. The search/add function can therefore be simply defined as the following command sequence issued to the system by the user:

First, step 4010, a user contemplates a search to perform. The exemplary example illustrated in FIGS. 8 and 9 are for a Patent 123.

Next, step 4020, the user enters the search criteria into the searching interface. The search term may be typed, spoken, written, selected from a menu of options, etc. into one or more input fields of the search engine.

At step 4040, the database is searched for the entity matching the subject of the search, such as Patent 123. The subject or topic of the search is read, as it was entered, possibly, but not necessarily after spellchecking, in the search box or combination of search fields. At step 4050, the decision tree branches depending on whether an exact match is found in the database or not.

If exact match found, at step 4060, the search is successful. At step 4070, the success message is displayed to the user and the database entity is returned along with all its associated data.

If the exact match was not found, then a new entity in the database for the exact subject (or topic of search) as defined by the searching user, and modify the database with all associated data for the newly created entity.

At step 4080, the search is determined unsuccessful and at step 4090, the unsuccessful search message may be returned to the user. This step may be optional and the process may proceed directly with either steps 4092 or 4094.

At step 4092, the system may present a prompt to the user requesting whether the subject not found should be added to the database. If the user desires the subject to be added, then at step 4094, a new entity/record for the subject of the search subjects is created in the database, and its relevant data written to the records, in the appropriate database formats. An optional display message may be presented to the user alerting the user that the addition was completed or successful at step 4096. The process then ends at 4100.

The 'Search/Add' functionality may be implemented using one or more software buttons. For example, instead of using a 'Search/Add' button, pressing which twice, before and after an unsuccessful search, will compete a search/add function as described above, a system may chose to provide separate buttons for 'search' and 'add', pressing which consecutively, before and after an unsuccessful 'search', respectively, will in essence achieve the same functionality, 'Search/Add'. Embodiments described herein are directed toward reading and possibly writing to the search database regardless of its implementation using a single 'Search/Add' button, or tab, or multiple buttons, or tabs, achieving the same result, namely the post search addition of a subject/topic of an unsuccessful search of a database, to the said database.

Embodiments of the search/add combination of the exemplary embodiment may be used with the public-initiated opinion poll as illustrated in FIGS. 1-7b. In this exemplary case, when a user enters in a subject matter for searching, the system will determine whether the subject is already in the database with an associated set of opinion statistics. If the subject is found, then the results are shown, and the user can review or cast a poll regarding the subject matter. However, if the subject is not already found in the database, then the user may be prompted to add the subject to the opinion poll database. Therefore, the user may add the subject to the polling database. Once added, the subject matter may be returned to the user as another subject of the poll. Accordingly, the user may then cast a vote regarding their opinion of the subject according to the details of the poll.

Thus, an exemplary use of the 'Search/Add' function is in the VoteBlast™ product. In this embodiment, users search the VoteBlast™ database for opinions. They do this by typing their topic in the 'Search/Add' box. For example, a user interested in searching the database for opinions about 'Obama Foreign Policy' types that string in the search box. If the topic exists in the VoteBlast™ database, then the search query engine returns the topic 'Obama Foreign Policy' along with its associated opinions and other data (e.g., images, GPS, information, etc.). However, if the topic defined as 'Obama Foreign Policy' does not exist in the VoteBlast™ database, the system creates that topic in the database, adding the topic to the database, by writing to the database. The user may first be alerted to the missing subject entry and/or prompted to enter a new subject in the opinion poll, or the system may automatically update the polling database with the searched subject matter and return a successful search result as the user's entry is now saved in the database.

The addition to the database enables the user, who is now also the creator of the topic, to express his/her opinion about the topic 'Obama Foreign Policy' and add it to the topic in the database if he/she so chooses. The next time a user, any user, searches the database through the search function for the topic 'Obama Foreign Policy', the query will result in a successful search and a match, returning the 'Obama Foreign Policy' data/entity along with all its associated data, such as the previous user's votes, any associated pictures, GPS, information, etc.

In order to maintain a record of who has created new topics in the database, the implementation might include a function or module, in which in addition to the topic details being written to the database, other information is also saved to the database. Other information may include, for example, the user ID, username, date, time, IP address of the user, mobile phone number, UUID, parent/child topics, categories, etc. in conjunction with the topic and as a part of the newly added entity. The other information may be automatically retrieved from the client device or interface with the server, or may be requested by the system and/or inputted by a user. Some features may also automatically be generated based on other selections. For example, a given category may be automatically populated one or more fields within the database once selected for a given subject matter.

In this embodiment, the 'Search/Add' function, will enable a user to express his/her opinion about anything, whether or not that thing, has been of interest of other users in the past, who have expressed opinions about it, or not. This feature, allows users to add topics/subjects to the database, making the database an ever expanding one, which increasingly will contain topics/subjects of interests of all users interested in expressing opinions about anything, anywhere, anytime.

An exemplary apparatus for a public-initiated opinion poll, therefore, may include:

A software system consisting of a server communicates over a network, such as the Internet (web) or an intranet, with a client such as a smartphone application (app), a web browser, or a software program running on any network appliance or computer. The software is configured to present one or more screens, pages, or data otherwise intended for a user, to the software resident on the client. The software is configured to receive a search query input in a search field from an application, browser, or software resident on the client regarding the public-initiated opinion poll, or anything else in which the user is interested, and the server is configured to cooperate with a database.

The application, browser, or other client software in use has a search module configured to complement a 'Search' function with an 'Add' function to the database, where the search module on the server has an engine that parses the user input in the search field and then figures out the search topic (e.g., "Patent 123"). The search module then sends an inquiry to the database, where the database is searched for the entity, or entities, exactly matching the subject of search. Alternatively, semantically similar matches may also be returned as the subject matter of an opinion poll, or other category data searched by the user, matching the inquiry. The searched subject matter may or may not first be spell corrected or otherwise first edited by the system before searching.

The search module may be configured to add a database entry on a search query, when the search result is 'null' or the 'subject/topic not found'. The module adds the subject/topic of the unsuccessful search/query to the database that was searched such that in subsequent searches the topic/subject will exist, and then will hence be found. The search module therefore both reads data in the database in response to the search query and writes data entries into the database, when topics/subjects of the search are not found in the database, thereby modifying/enhancing the database as the search algorithm of the module is searching. The database entry for the subject of the search is stored along with metadata obtained with that query such as the geographic location of the client making the search, user demographics, the IP address; etc.

In an exemplary embodiment, the database entry for the topic of the search is stored along with metadata obtained with that query including a geographic location of the client making the search, and an IP address of the client.

In an exemplary embodiment, the client application resident on the client device is the module that presents the template for the opinion poll to allow greater specificity and user customizing of the opinion poll to the user initiating this poll and has the user interface coded to present the subject field.

In an exemplary embodiment, a module configured to present a template for the opinion poll, where a user interface of the module presents a subject field on a display screen of the client, and the client communicates the content entered into the fields of the user interface, web page, application, or the client device's software, regarding the opinion poll over the network to the server, and a software program resident on the server takes in the details of the opinion poll, and the backend server aggregates an opinion level expressed by activating the opinion level button with all of the cast opinion levels previously submitted by users of different client machines on this opinion poll and feeds this information back to the client to be displayed on a display screen of the client, where any portion of the server implemented in software and any software implemented on the client are both stored on their own non-transitory computer readable medium in an executable format.

Embodiments as described herein permits a user, searcher of the database to update the database when an entry is not found. The addition of an entry may track and provide the same fields already provided in the database. The user may be prompted to add or decline the addition of the new subject matter and associated fields into the database, or the addition may automatically occur. If information is desired from a user, then a prompt may appear to the user to enter the necessary or desired information, which is then stored in the respective field of the database.

Embodiments as described herein therefore permit the user to specifically define the subject matter or field saved in the database that can later be searched and retrieved. Subjects may also be duplicated or prevented from being duplicated. In contrast, traditional databases are created and hosted by the owner of the database. If a user is permitted to add information, it is generally through a template of pre-selected options that is then reviewed by the owner and approved for saving into the database. Therefore, the user does not have the freedom and flexibility to ultimately dictate the data saved to respective fields of the database until now.

Geographically Verified Opinion Casting or Voting

There exists numerous opinion casting, survey, or polling systems that allow users to express opinions about specific topics, take part in specific polls or surveys, or otherwise rate or review subjects (e.g., restaurants, hotels, movies, etc.) online. In conventional systems, users can generally use these systems from any location provided that they are connected to the Internet, as well as having the necessary access credentials (e.g., poll ID, password, username, etc.) for the opinion/rating/polling system. This means that a user with access to the Internet and the opinion/rating/polling system can express his/her opinion, participate in a poll, or rate subjects or places such as restaurants, from locations other than that of the subject of the poll, rating, or opinion survey. One unintended, and unfortunate, consequence of this is that people can write fake reviews for businesses they have never visited, or are not visiting at the time of writing the review, or when they are expressing their opinions about the location or an attribute of it.

According to the market research firm, Gartner, by 2014, one out of every ten online product reviews will be "fake", posted by people who have been secretly paid to write them. This, presumably, and most likely, by people who are not at the location, and/or have, most likely, never been to the location about which they are writing a review. This practice is called "astroturfing" and in 2013 the New York State Attorney General, Eric Schneiderman, busted 19 Search Engine Optimization (SEO) companies, for offering to write reviews for businesses. These SEO companies hired freelancers in places such as Bangladesh, Eastern Europe, and the Philippines to write fake reviews for businesses located in the US.

The main problem with the practice of writing reviews, rating, participating in polls or surveys about places, which the reviewer has not even visited, is that it diminishes the integrity of all reviews, even the ones from genuine customers and reviews. As such, the end-user will not only never know if a given review was legitimately written by someone who at least visited the location he/she has reviewed, but also the owners of businesses can potentially be targets of negative malicious reviews written by people who have never been to/at the location of the business they are "reviewing", or rating.

Embodiments of the present design provide verified opinion casting by geographically verifying a caster's position relative to the subject matter of the poll. In this system, each topic/subject of opinion, survey, poll, subject of rating, etc. may have a GPS coordinate assigned to it. For example, the food for a given restaurant, or the restaurant itself, has the GPS coordinates of the restaurant assigned to it and saved in the polling/opinion system's database. When a user who is using a device that is equipped with a GPS system, such as a smartphone or tablet, attempts to express an opinion about a business, topic/subject, or participate in a survey, poll, or write a review, or rate a topic, the system first checks the user's GPS coordinate, then it tries to match the user's GPS coordinates to the coordinates of the business, topic/subject, survey, or poll, which the user is attempting to do, or participate in. If, and only if, the user's GPS location has been determined by the polling/opinion system to match the location of the topic/subject of the opinion, poll, survey, rating, review, etc., then the system allows the said user to participate in a poll, survey, provide an opinion, write review, or rate the topic/subject, as it is determined that the user is in fact at the location of the topic/subject of his interest. This geographical authentication of users will provide a simple, yet very powerful, guarantee to all users, as well as to the owners of polls, surveys, businesses, etc., that all participants in polls, surveys, or writers of reviews and ratings, as well as providers of opinions, have been at the location of the said poll, survey, business, etc. at the time they wrote the review, participated in a poll/survey, or otherwise rated the establishment, etc.

In essence, this invention, broadly couples a user's action on a device to the location of the device at the time of the action, requiring that the GPS coordinates match or be within some threshold deviation from the given GPS coordinates of that associated with the action. Otherwise, the user is disallowed from taking a specific action. Therefore, at least in the context of opinions, reviews, polls, surveys, and ratings or reviews, the required location matching guarantees no one, other than people at a specific given location or in a given proximity thereto can participate in polls, surveys, ratings, writing reviews, etc. about that specific location.

Accordingly, if a user is not determined to be at GPS1 or within a set distance x or proximity from GPS1, then he/she will automatically be disallowed from taking an ACTION regarding the location GPS1. Embodiments as described herein may be used to verify the integrity of an opinion being cast. Therefore, patron's relying on the subject matter, such as a cast opinion or survey, are verified to have been present at the location. Therefore, false opinions supporting a business or malicious opinions against a competitor business is greatly reduced, and the integrity of the remaining opinions increases.

The geographic verification may be performed in real time, such that an opinion cannot be cast until the location is verified to the subject matter of the opinion. This simultaneous requirement also increases the integrity of the opinions, in that the opinions are likely occurring in real time to the impressions generating the opinions. Therefore, an opinion caster is providing an immediate feedback opinion on an experience temporally near the creation of that feedback. As such, memories are not faded or experiences are not muddled.

Figure 10:
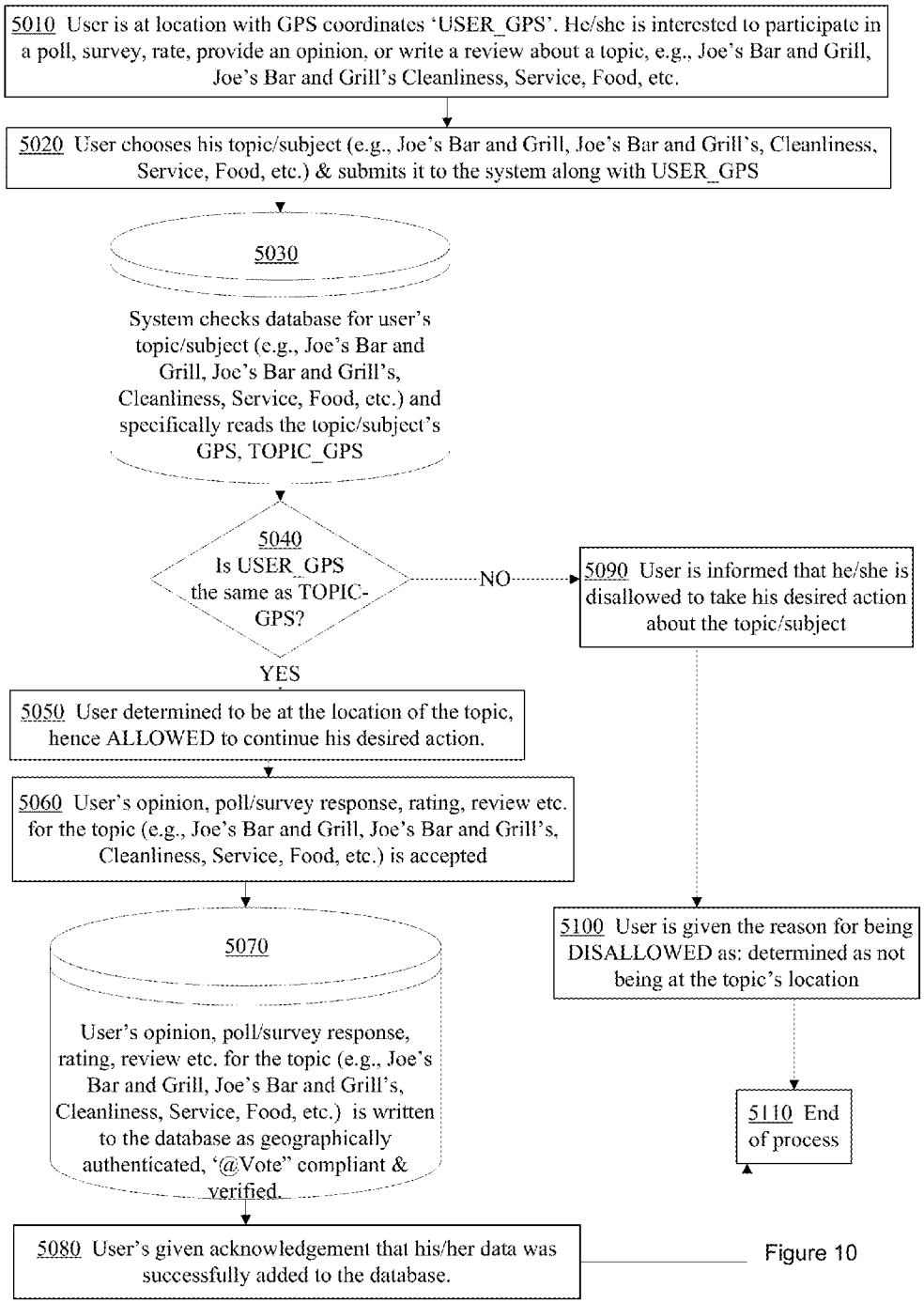
FIG. 10 illustrates an exemplary flow diagram implementing an algorithm to execute the geographic verification as described herein.

FIG. 10 illustrates an exemplary flow diagram implementing an algorithm to execute the geographic verification as described herein.

First, at step 010, a user is interested in participating in a poll, survey, rating, opinion cast, or review about a topic or given subject matter. The user is on a device that has a GPS located that provide the GPS coordinates of the device, "USER_GPS."

At step 5020, the user navigates to a website hosting the desired poll, survey, etc. and chooses the desired topic or subject matter for the associated opinion. The user then submits the inquiry to the opinion interface. The application also retrieves the GPS coordinates of the device, USER_GPS, which is submitted along with the inquiry over the network.

Next, at step 5030, the inquiry and USER_GPS, is communicated over the network, such as the internet, to a remote server which checks an associated database for the user's topic/subject. The server communicates with the database to read and/or write information comprising fields regarding the poll, survey, etc. Once the desired topic is found in the database, the server reads a field comprising the GPS associated with that topic, TOPIC_GPS.

A decision is then made at step 5040 to determine whether the location of the user is the same as that associated with the topic. "The same" may be determined within a given proximity. Thus, the database may also include a PROXIMITY field that identifies a maximum proximity to determine whether the locations are the same. The maximum proximity may also be read with the GPS location associated with the subject matter so that a determination may be made about the relative locations of the user and the subject matter. The locations are determined to be "the same" if the USER_GPS is within a PROXIMITY radius around TOPIC_GPS. As described further below, the proximity may be automatically set by the system when a subject is created, or may be set by the creator of the subject matter in the database.

At step 5050, the user is determined to be at the location, and therefore is allowed to continued with the desired action, and at step 5060, the users opinion, poll, response, etc. regarding the given subject matter is permitted and accepted by the server.

Therefore, at step 5070, the server communicates with the database to write the user's information to the database, thus completing the desired action by the user. For example, the user's opinion, poll, response etc. for the given subject matter is written into the database as geographically authenticated. The user may then be given an acknowledgement at step 5080 indicating that the supplied data, including the opinion poll, review, etc. was successfully added to the database.

If the user's location was not verified at step 5040 to be the same as the associated location of the subject, then at step 5090, the user receives a notice that their submitted data is disallowed from the opinion, and that the desired action cannot proceed. The user may be provided with the reason for disallowance, such as at step 5100, in which the user is notified that their location is outside of the range associated with that topic's location.

The process then ends at step 5110.

The system is shown and described as preventing a user's desired action from completing if the GPS location is not determined to be the same between the user and the topic. The system may alternatively permit the desired action, but indicate whether authentication was provided. Therefore, when search results are provided, those results that are or are not authenticated may be filtered, weighted, or otherwise indicated to a viewer, such that appropriate relevance may be given to those that are authenticated over those that are not. In an exemplary embodiment, a flag or toggle field may be saved in the database associated with the respective opinion indicating whether the opinion is authenticated or not. If it is authenticated, then the database indicates yes, and the system may then use that field to filter, weight, or search for opinion data when queried by another user.

An apparatus configured to perform the geographic verification as described herein may include:

A software system may consist of a server. The software server resident on a computing device is configured to communicate over a network such as the Internet (web) or an intranet, with a client application, such as a smart phone application (app), a web browser, or a software program, running on a network appliance. The client application is configured to present one or more screens, pages, or data otherwise intended to be displayed on a display screen for a user of the network appliance. The software server is configured to enable the user of the client application to create and convey opinions on a public-initiated opinion poll to express 1) likes, 2) dislikes or 3) any combination of the two, as well as to further elaborate on an opinion by entering text, or other graphical inputs, about anything, anyone, anywhere, anytime.

The software server has a geographic module to geographically verify both a location of the client application and a location attribute of a geographic location associated with a topic of the public-initiated opinion poll. The server may be configured to cooperate with the client application on the network appliance that cooperates with a tracking module on the client application that tracks the geographic location of the client application to supply the client application's geographic location to the software server. The client application may be one of a smart phone application or a web browser. The server may couple i) a user's ability to create or convey actions for the opinion poll to ii) the geographic location of the client at the time of the action, requiring that the geographic location of the client and a geographic attribute associated with the topic/subject matter of the opinion poll, such as GPS coordinates, match. In the event the locations do not match, the user of the client is disallowed from taking a specific action in the context of opinions, reviews, polls, surveys, and ratings or reviews. Accordingly, embodiments as described herein may guarantees that no one, other than people at a specific given location can participate in polls, surveys, ratings, writing reviews, etc. about that specific location.

Exemplary embodiments may also include a module to optionally associate a GPS coordinate to an opinion topic, where each topic of opinion, survey, poll, subject of rating, etc. has a GPS coordinate assigned to it.

When a user creates a subject matter of an opinion, the user may determine whether the geographic verification is enabled for that opinion. The creator may be present with an interface that permits the creator to enter in data to one or more fields associated with the opinion subject matter. The fields may be automatically determined if one or more selections are made in one or more other fields. For example, a selection of a specific category may auto-populate one or more other fields, which may be overwritten by a user, or may be mandatory, as set by the application. Field data may also be inherited if one subject is created as a subset or sub-subject of another subject. For example, if the white house is a subject that requires the geographic verification, and the location is provided, a sub-subject about the archives under the white house may inherit the same geographic verification requirement as well as the associated geographic location data.

If the user selects that the geographic location verification is required before an entry may be added regarding the given subject, the user may be prompted to enter an associated geographic location, the user may be offered to use the present geographic location of the device creating the subject matter, or may obtain the geographic information from publicly available sources. Accordingly, the user may enter the information directly, or the system may obtain the information from the device or other sources, either automatically or once prompted by the user.

Figure 11A:
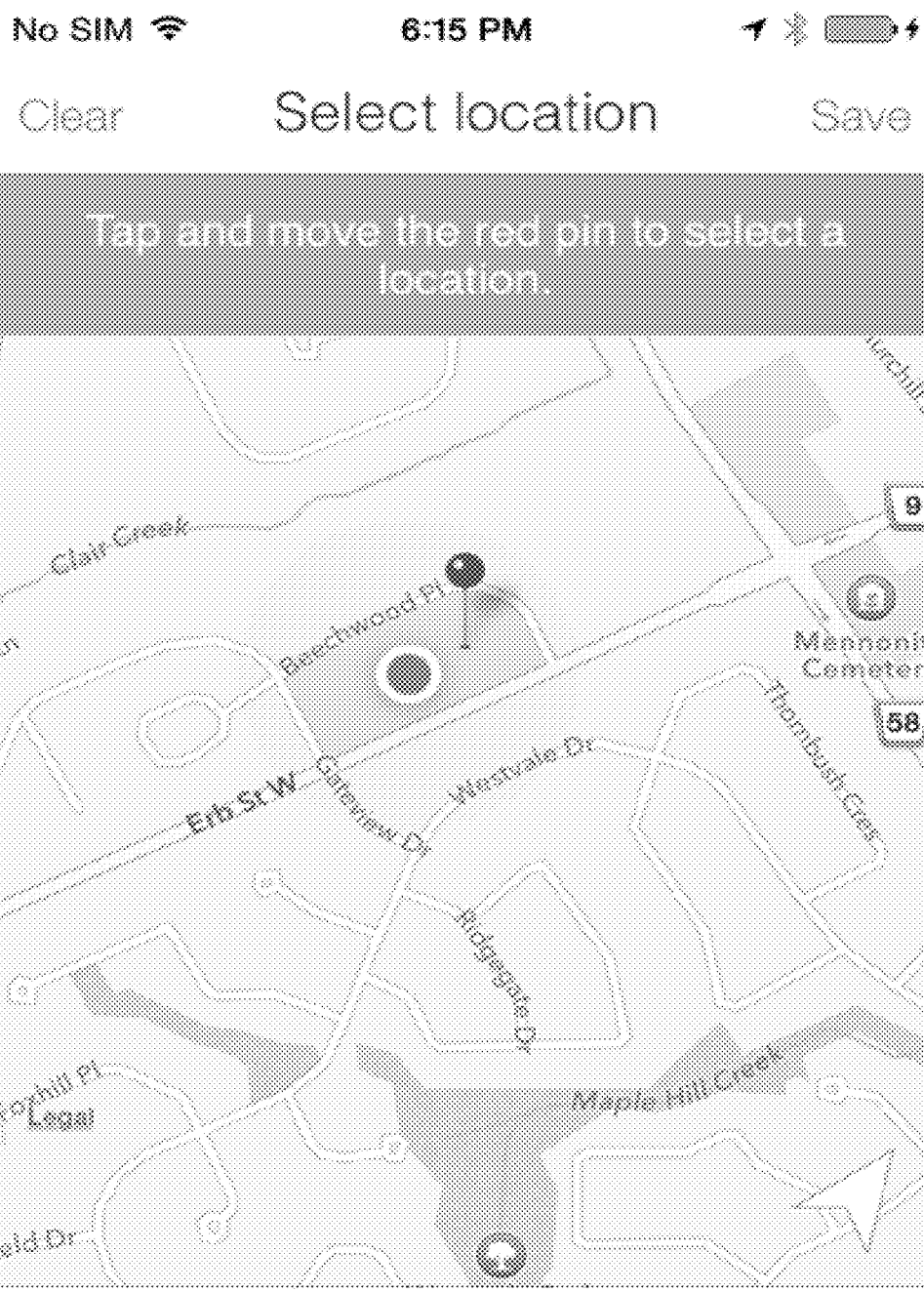
FIG. 11A illustrates an exemplary user interface for selecting a geographic location to be associated with a given subject matter.

FIG. 11A illustrates an exemplary user interface for selecting a geographic location to be associated with a given subject matter. As shown, a map is displayed to a user, and the user may indicate a location on the map to associate the opinion subject matter. The system may then determine a coordinate location, such as latitude and longitude associated with the selected map location. The position may then be communicated from the client device, over the network or internet, and saved by the server into the database associated with the desired subject matter.

Figure 11B:
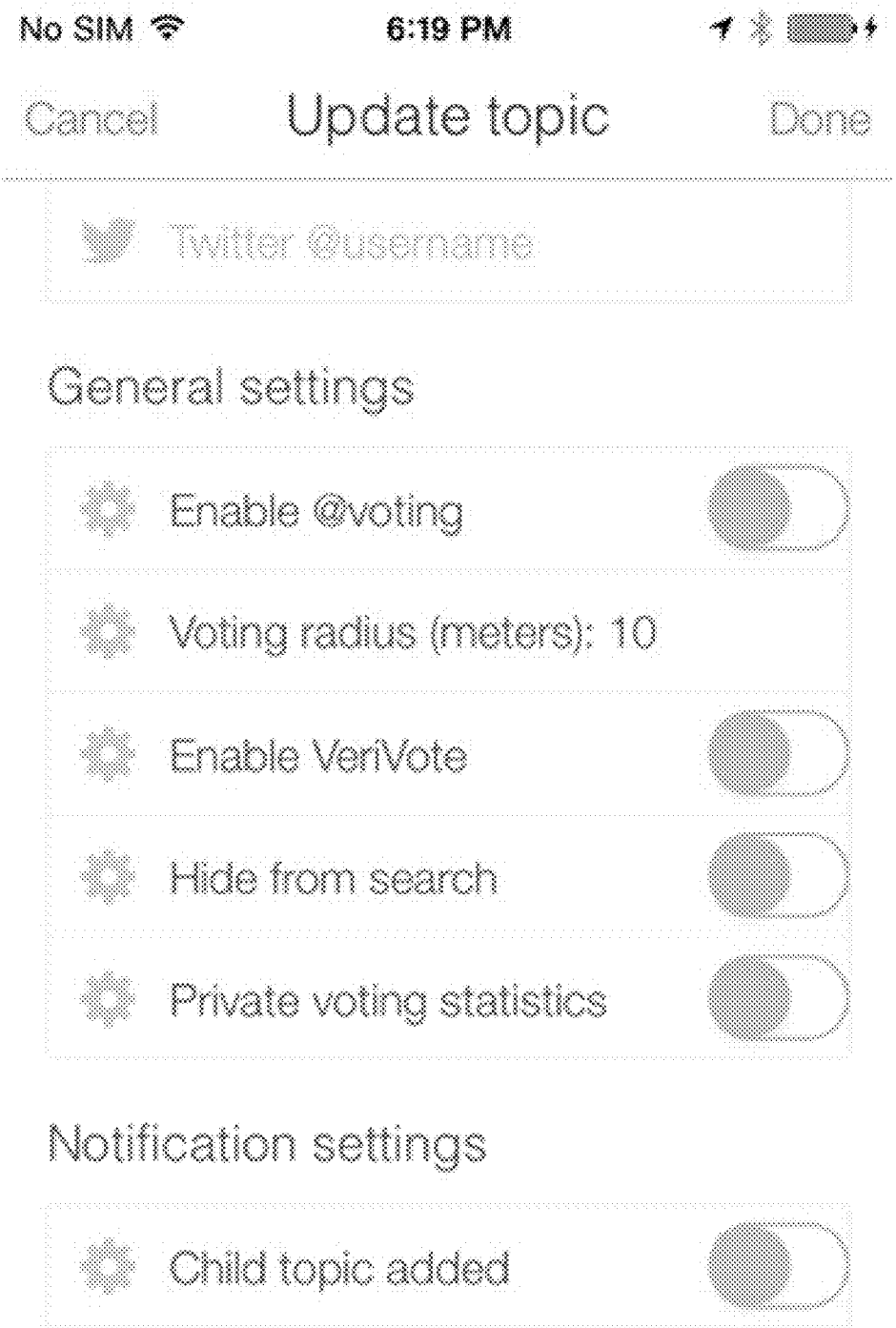
FIG. 11B illustrates an exemplary user interface for creating and/or editing a new topic within the opinion polling system.

FIG. 11B illustrates an exemplary user interface for creating and/or editing a new topic within the opinion polling system. The user may enter or update general settings associated with the opinion poll. The system may permit the user to select whether the geographic verification is required (called @voting on the exemplary interface). A radius associated with the geographic verification may also be entered.

The user may enter data through one or more text fields, toggle or radio buttons, or other input/output selections.

Once the geographic verification selection is made, a user must be within the associated geographic location before an entry associated with that location may be updated, or added.

The geographic verification is generally described in terms of casting a survey opinion poll or like user feedback data. However, the design is not so limited. Embodiments may be used in any application where input is requested by a user and a specific location is associated to the input. Alternatively, a specific location may be desired for entering or preventing information to be entered by a user. Embodiments as described herein may be used to verify the geographic location prior to permitting the user entry. Geographic data is also disclosed as obtained by a GPS device incorporated into the client device, such as the smart phone or tablet. Other location verification systems may also be used. For example, location may be verified through an IP route at a location near the location associated with the entry. As data is routed over one or more networks, location information is usually obtained or appended to the data string. This location data may be used to locate the user sufficiently close to the subject matter to permit the user update to occur.

Late-Bound Topics for a Future Topic within the System.

As described herein, opinion polling, surveys, etc. are informed by the topics about which the opinion or survey is being conducted. The topic governs the search to navigate to the opinion, or the creation, addition of opinions about a given topic. Topics and subject matter are used herein interchangeably. Topics are a first class object within the exemplary opinion system, embodiments of which are described herein. Users express an opinion on topics.

In an exemplary embodiment, Quick Response (QR) codes may be used to facilitate quick access to a topic or other objects within the opinion polling system. Underlying each QR code is a URL in the form: http://VoteBlast.com/<object type>/<unique object identifier>. QR codes for topics take the form: http://VoteBlast.com/t/<unique topic identifier>. On the mobile application, scanning a QR code will extract the unique topic identifier from the URL and fetch the topic and its associated metadata from the opinion polling system's servers. Similarly, scanning a QR code by a third party application will invoke the device's web browser and display the topic.

Because QR codes are used to uniquely identify a topic within the opinion polling system, QR codes may be produced for an existing topic at any time. Existing QR codes may be saved as images and printed or reproduced in any form. However, printing QR codes from the polling system mobile application or website may be inconvenient and a potential barrier to adoption by potential customers. Specifically, the customer is generally first required to create the topic, associate a QR code to that existing topic, as the topic is within the associated QR code link, and then print the associated QR codes in whatever desired format. However, if a customer can receive pre-printed QR codes and then create a desired topic at their convenience, the customer may be inclined to create the topic and use the pre-supplied QR codes. Accordingly, a means to produce unique QR codes in advance of their corresponding topic being created is desired.

A late-bound topic is a placeholder for a future topic within the opinion polling system. The opinion poll system creates late-bound topics for use by sales staff. A late-bound topic exists on the opinion poll system database with the following properties:

unique topic identifier—The identifier is a string that uniquely identifies the topic. It takes the same form as regular topic identifiers.

issuer—a string that uniquely identifies the opinion polling user that created the late-bound topic.

lbt—a Boolean flag indicating that the topic is a late-bound topic. A value of false would indicate that the object is not a late-bound topic and the object would be expected to have a name.

In practice, the opinion polling system would produce late-bound topics, and QR codes corresponding to the late-bound topics would be printed on behalf of future customers. Sales staff may then distribute QR codes for late-bound topics and 'activate' them during the customer-signup process.

A late bound topic may be activated by scanning a late-bound topic QR code from the opinion polling application. The process proceeds as follows:

First, the QR code application launches a web browser and retrieves the website associated with the QR code. The system may use a module to extract the unique topic identifier from the QR code. The module may then fetch the topic from the opinion polling server. The server will return a topic object with the late-bound topic flag set to true.

Since the late-bound topic is true, the module redirects the user to a website page within the system application that permits the user to enter a name, description, category, and other metadata associated with the subject matter for the scanned QR code. The application submits the user-entered metadata to the opinion polling server along with the unique topic identifier associated with the QR code.

The opinion polling server then associates the metadata with the existing late-bound topic object. The lbt flag is set to false, which upgrades the object from a late-bound topic to a regular topic.

If the user selected a category, then child topics for the child categories will be automatically created during the topic-upgrade process.

The opinion polling server inserts the newly created topic into the search index, allowing the topic to be searched for and voted on immediately. Once activated, subsequent scans of the late-bound topic QR code will direct the user to the topic.

An exemplary apparatus for a public-initiated opinion poll that permits late bound topics, such that a QR code that can make a prior association with a specific topic of the public-initiated opinion poll, may include a software system.

The software system consists of a server that communicates over a network, such as the Internet (web) or an intranet, with a client, such as a smartphone application (app), a web browser, or a software program running on any network appliance or computer. The client is configured to receive an input from a machine-read code, such as a QR code or bar code, in a field from an application or browser resident on the client regarding the public-initiated opinion poll. The server is configured to cooperate with a database, where the database has both a pool of assigned bar codes associated with their own opinion poll, and a pool of blank database entries associated with reserved bar codes available to be associated with a future topic. Each bar code is unique from the other bar codes, where the client has a bar code reader module configured to facilitate quick access to an opinion topic stored in the database based on the unique bar code. The bar code reader module is configured to change an indicated status of a bar code when a first bar code from the pool of reserved bar codes is assigned to its own opinion poll and would now be in the pool of assigned bar codes.

The client communicates the content entered into the fields of the user interface, web page, application, or the client device's software regarding the opinion poll over the network to the server, and a software program resident on the server takes in the details of the opinion poll, and the backend server aggregates an opinion level expressed by activating the opinion level button with all of the cast opinion levels previously submitted by users of different client machines on this opinion poll and feeds this information back to the client to be displayed on a display screen of the client. Any portion of the server may be implemented in software and any software implemented on the client are both stored on their own non-transitory computer readable medium in an executable format.

Unifying Anonymous User Activity with Full User Activity

Registered opinion polling system users may be given a unique string knows as a 'VoteBlast™ identifier' (VBID) that identifies them within the opinion polling system. The VBID allows topics created by a user and opinions expressed by a user to be associated with the user's account.

Anonymous users are users that are not authenticated with the opinion polling system. These users may be users that do not have an account or have simply signed out of an existing session. Anonymous users may create topics express opinions, and may eventually join and/or sign into the opinion polling system.

However, the opinions and topics created by anonymous users have value, and should be associated with users when they upgrade from an anonymous to non-anonymous state. Accordingly, embodiments described herein provide a process for maintaining the association of topics and opinions with anonymous users.

Figure 12:
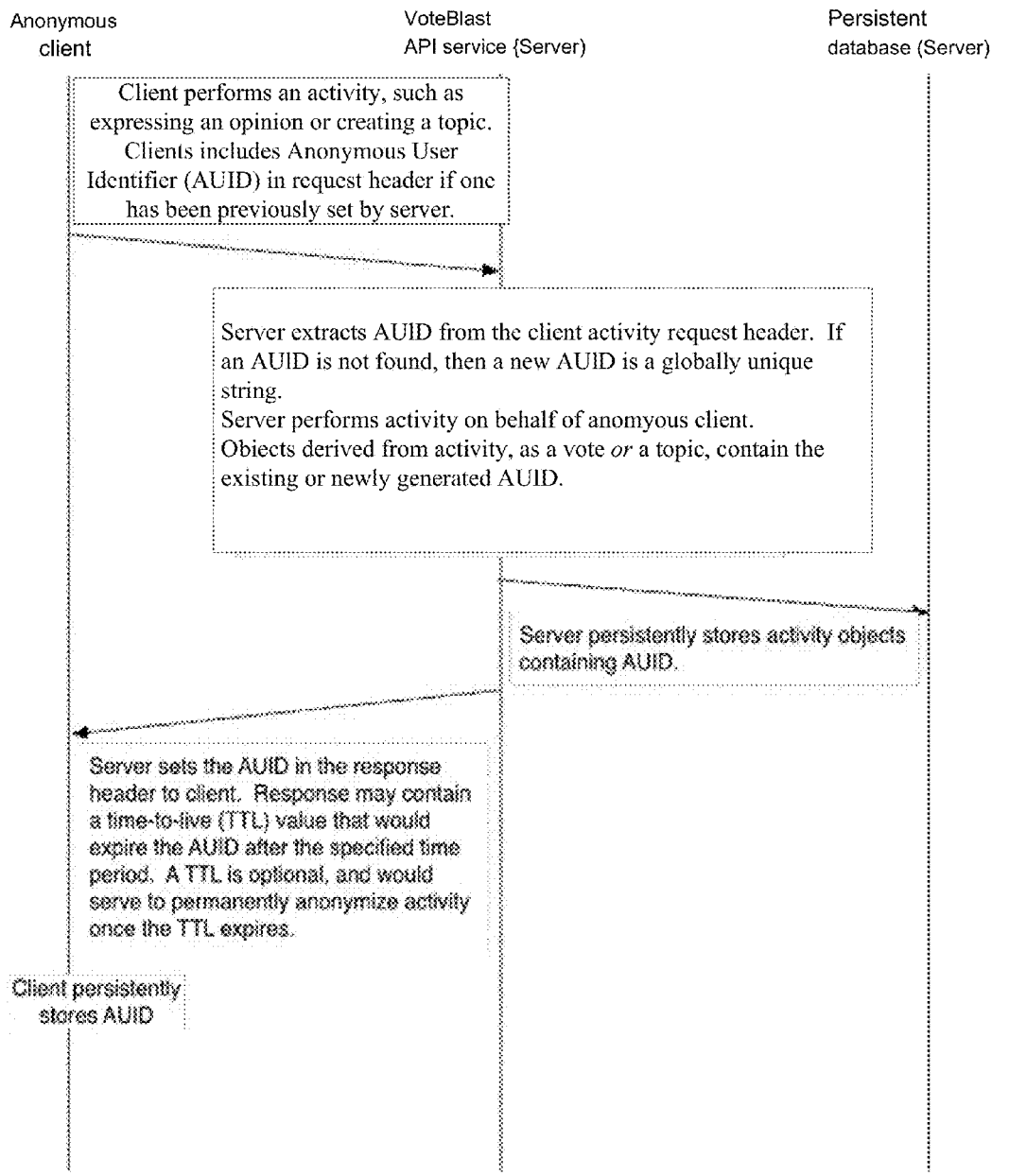
FIG. 12 illustrates an exemplary process for maintaining the association of topics and opinions with anonymous users, while preserving their anonymity until they have decided to join the opinion polling system as an identified or registered user.

FIG. 12 illustrates an exemplary process for maintaining the association of topics and opinions with anonymous users, while preserving their anonymity until they have decided to join the opinion polling system as an identified or registered user.

The opinion polling system comprises a server to control the interaction between the user, anonymous or otherwise, with the system, and read and/or write to the database which maintains the information and data associated with the opinion polling system.

As shown, an anonymous client performs an activity. An activity may be any action of the user. For example, the user may express an opinion or create a topic. Interactions between the anonymous user and the opinion polling server are identified by an anonymous user identifier (AUID). The AUID may be associated with the client device.

Setting the AUID in the client browser may inadvertently associate anonymous activity with a different authenticated user. The AUID cookie should therefore have a reasonable expiration date to avoid this association.

The server then extracts the AUID from the client activity request header. If the AUID is not found in the opinion polling database, then a new AUID is created, where the AUID is globally unique string. Once the AUID is created or if the AUID is found in the database, the server performs activity on behalf of the anonymous client. Objects derived from the activity, such as a vote or a topic creation, contains the existing or newly generated AUID.

The server then communicates between the client device and the database by the AUID. The server may set a time-to-live (TTL) value that would expire the AUID after a specified time period. If the TTL is used, which is optional, the anonymity of the user would permanently be maintained once the TTL expires. Alternatively, the system, through the client, may persistently store the AUID. In this case, the same AUID may be used in all interactions from the client to the server, thus identifying repeated actions by the same client device.

Figure 13:
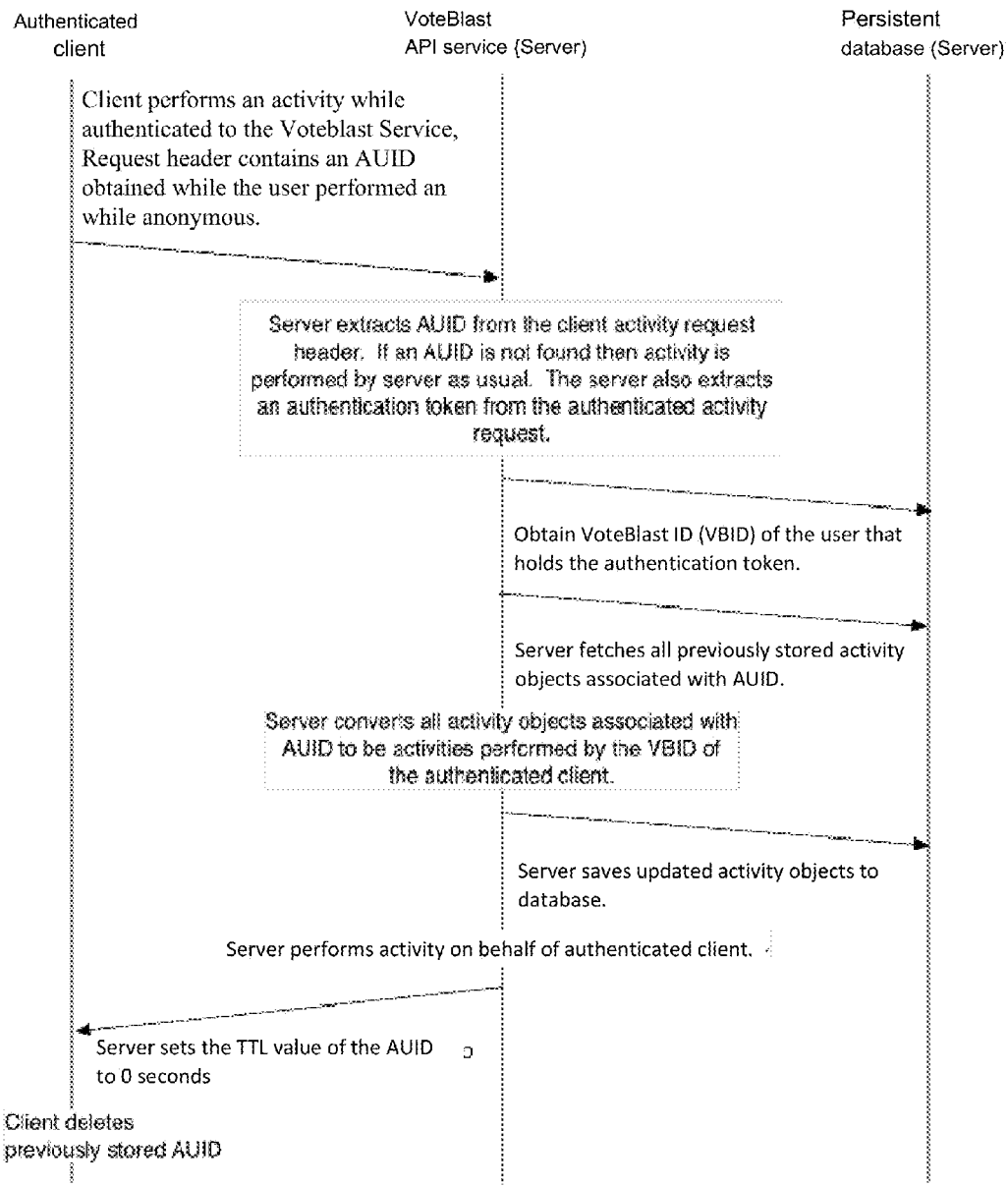
FIG. 13 illustrates an exemplary process for maintaining the association of topics and opinions of non-anonymous users, and associating previous activities while as anonymous users once the user becomes an identified or registered user.

FIG. 13 illustrates an exemplary process for maintaining the association of topics and opinions of non-anonymous users, and associating previous activities while as anonymous users once the user becomes an identified or registered user.

Non-anonymous users are, by definition, users that are authenticated and have an authentication token. On every authenticated API call to the opinion polling server, the server is looking for an authentication token and an existing AUID. FIG. 13 illustrates an exemplary process for unifying the activity of a previously anonymous user with the activity of an authenticated user.

The user performs an activity while authenticated to the opinion polling system. The header information sent from the client device to the opinion polling server includes an AUID associated with the device, which was obtained while the user performed an activity while anonymous.

The server then extracts the AUID from the client activity request header. If an AUID is not found in the associated database, then the activity is performed by the server as usual, i.e. as an authenticated user. Since no activity was recorded or stored while as an anonymous user, there is no field to reconcile between the user identifications.

The server may also extract an authentication token from the authenticated activity request. The server then communicates with the database to obtain the opinion poll identification (VBID) of the user that holds the identification token.

The server retrieves or fetches all previously stored activity objects associated with the user's device AUID. The server then converts all of the fetched activity objects associated with the AUID to be actively performed by the VBID of the authenticated client. The server then saves the updated activity objects to the database. The activities of the anonymous user are therefore updated to be those of the authenticated user.

Once the anonymous user activities are updated, the server performs activity on behalf of the authenticated client. The server may also reset or erase the AUID from the client device. For example, the server may set the TTL value of the AUID to 0 seconds. As no activity is associated with the AUID, as all instances have been updated to the VBID, the AUID is unnecessary and the AUID may be deleted from the client device.

If the user logs out of the system, such that they become an anonymous user again, the system may always reinitiate the anonymous user process as illustrated in FIG. 12.

Anonymous user identifier objects can accumulate over time in the database and never be associated with an authenticated user. In an exemplary embodiment, these objects may therefore be deleted from the database periodically. For example, these objects may be deleted at the same expiration rate as their associated client cookies. Once an anonymous user object has been deleted, all previous activities associated with the anonymous user object may be permanently anonymous.

An exemplary apparatus for a public-initiated opinion poll may include a web service running on a server that communicates over a network such as the Internet (web) or an intranet, with a client such as a smartphone application (app), a web browser, or a software program running on any network appliance or computer. The web service may be configured to receive an input from an application resident on the client regarding the public-initiated opinion poll, and the server may be configured to cooperate with a database. The database has both a pool of known users of the web service associated with their own web service identifier and an account at the web service and a set of tracked actions regarding each unknown/anonymous user of the web service who are anonymous and not associated with a known account at the web service. The web service is configured to allow anonymous users to create opinion topics as well as express opinions on existing opinion topics and those are the tracked actions regarding that unknown/anonymous user. A tracking module of the web service cooperates with the database to maintain the association of topics and opinions supplied from each anonymous user, while preserving his/her anonymity until that user decides to create an account on the web service. The tracking module then causes the topics and opinions supplied from the anonymous user to be moved into the user's account in the database once the user becomes a known user.

The client communicates the content entered into the fields of the web page regarding the opinion poll over the network to the server, and a software program resident on the server takes in the details of the opinion poll, and the backend server aggregates an opinion level expressed by activating the opinion level button with all of the cast opinion levels previously submitted by users of different client machines on this opinion poll and feeds this information back to the client to be displayed on a display screen of the client. Any portion of the server implemented in software and any software implemented on the client are both stored on their own non-transitory computer readable medium in an executable format.

Figure 14:
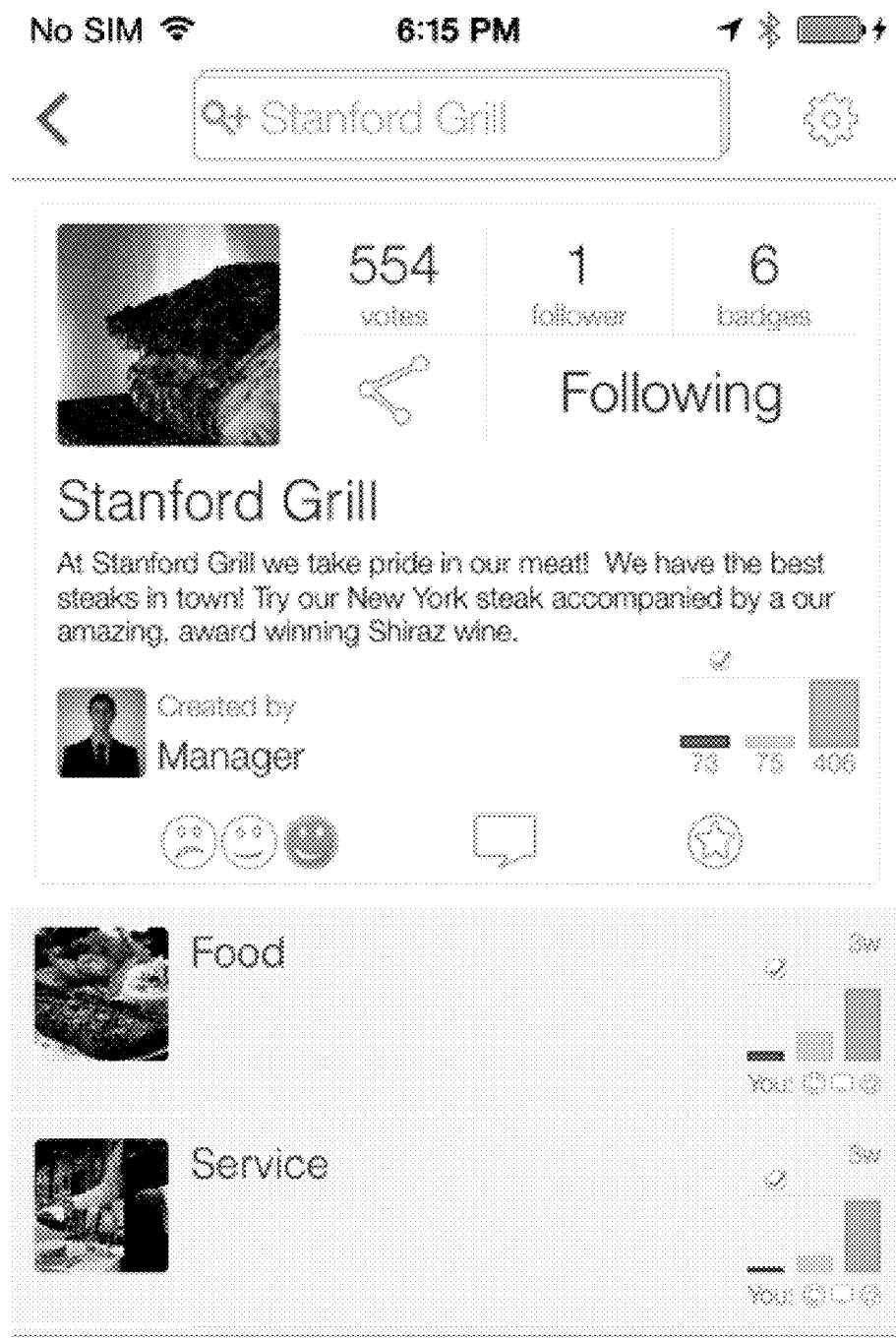
FIGS. 14 and 15 illustrate exemplary screen shots of an interface of embodiments of the system including a public initiated opinion poll.
Figure 15:
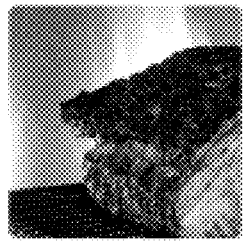
Figure 15:
Figure 15:
Figure 15:
Figure 15:
Figure 15:

FIGS. 14 and 15 illustrate exemplary screen shots of an interface of embodiments of the system including a public initiated opinion poll.

FIGS. 1-7b described further below provide an exemplary user-initiated polling system that may benefit from the features described above. Below example processes and apparatuses, such as those referred to in FIGS. 1-7b, provide a user-initiated opinion polling system that fundamentally and substantially enhances public opinion gathering, dissemination and utilization by:

changing the commercial polling and surveying paradigm; and redefining the way the consumer is heard by enabling the consumer to express his/her likes/dislikes on the subject of his/her choosing anytime, anywhere and when AND ONLY when the consumer initiates the survey/opinion process. Many embodiments will be described in which the system conducts a public-initiated opinion poll through 1) a media space, such as the Internet, web TV, an interactive or non-interactive cable TV, satellite TV, Internet-based TV, mobile phone network, etc., and/or 2) a consumer space such as a store, restaurant, mall, movie theatre, lecture hall, live concert or public event venue, etc. The client server system can conduct the opinion poll on subject matter on anything such as 1) content in the media space or consumer space, 2) a physical item such as a retail store consumer product or point of sales display, a billboard, an advertisement, a restaurant menu item, a club's ambience, etc., 3) an entertainment item such as a movie or play being played or performed in a theatre, or a lecture or speech in a room, 4) a videogame being played, 5) people, a person, a person's possession or attribute, 6) anything else; and thus, a user-initiated opinion poll on anything, anywhere and anytime, that is automatically captured and sent to a main server system.

FIG. 1 illustrates a diagram of an embodiment of a client-server network environment to implement the user-initiated opinion polling system. An application resident on the client device 110A-110C communicates over a network 100 with one or more servers 105A-105C and their databases 106A-106C. This client device-server system is configured to enable a user of the client device 110A-110C to conduct a public-initiated opinion poll to express 1) likes, 2) dislikes or 3) any combination of the two about anything, anyone, anywhere, and anytime. The client devices such as a smart phone 110A, Personal Digital Assistant/Tablet 110B, Laptop computer 110C may have a browser application resident along with one or more client applications scripted to run the opinion polling system operations and cooperate with the server.

The server, such as a first server 105A, maintains the opinion polls and keeps a profile of the opinion polls. When the server is an internet site, the server may service one of a traditional website, a social media space, or any combination of the two and may be comprised of at least one or more servers and cooperating databases. This new, simple, customer-initiated paradigm for public and commercial polling and surveying enables anyone to easily express opinions on any subject of his/her interest, using opinion level icons, and/or view others' opinions that might have been previously cast on a subject of his/her interest. A module, such as a client application on the mobile client device or server applet resident on the server, may be configured to present a template for the opinion poll. The client application has code scripted to present one or more opinion templates that are user customizable, have a subject field, and is configured to work with a browser and a remote server. The server applet works with a browser application resident on the client device and serves one or more web pages 120D to the client device with the resident browser.

Figure 2:
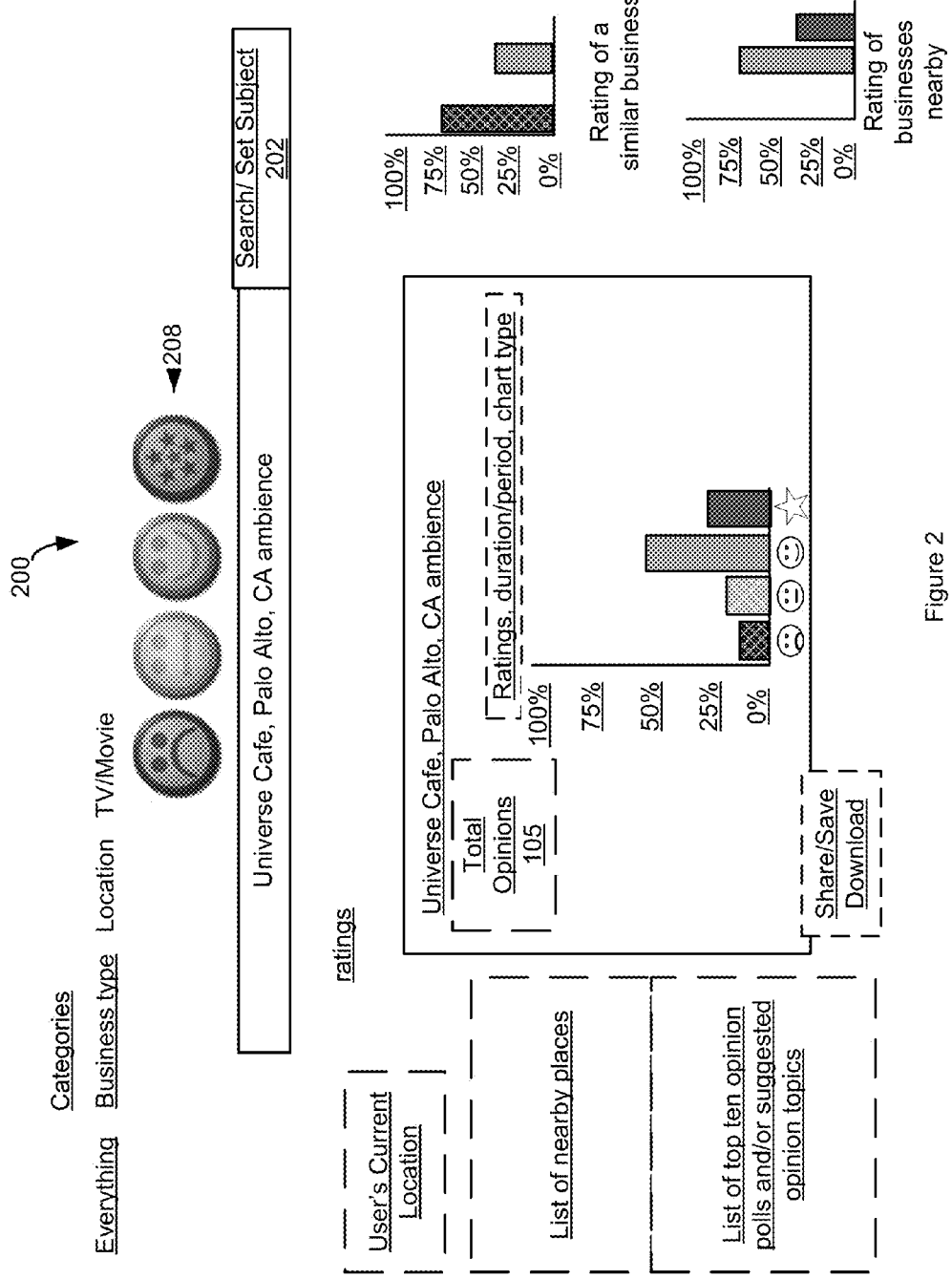
FIG. 2 illustrates a diagram of an embodiment of an opinion poll presented by a module to a user of a client device.

FIG. 2 illustrates a diagram of an embodiment of an opinion poll presented by a module to a user of a client device. A module, such as a client application on the mobile client device or server applet resident on the server, may be configured to present a template 200 for the opinion poll to allow greater specificity and user customizing of the opinion poll to the user of the client device initiating this opinion poll. A user interface of the module presents a subject field 202 on a display screen of the client device. The server may be configured to recognize content in the subject field 202 as choosing and setting the subject matter of the opinion poll. The content of the subject field 202 is solely initiated and decided by the user and not pre-selected by a third party and then presented to the user of the client device to give their opinion about that pre-selected subject matter of the opinion poll. The user interface and subject field 202 are configured to enable the user of the client device to select an overall subject matter and even specific features about that subject matter, which the user wishes to create the opinion poll on. The module is configured to enable the user of the client device to choose when to express his/her opinion, exactly about what subject matter to express his/her opinion on, and then to express his/her opinion level by activating/pressing merely a single opinion level button that has a very specific meaning e.g. BAD, GOOD, EXCELLENT with these simple software—or hardware-based buttons such as ☹ ☺ ☺ ⓘ ⓞ For example, any of the four opinion level buttons 208 may be activated.

The module may be configured on the opinion poll template 200 to provide subjects about which the user of the client device may be interested in by both 1) on a home page of the server showing a listing of opinion poll topics and their associated statistics that any user visiting the home page may be interested in reviewing, which these opinion polls were originally generated by other user's opinion polls and then maintained on the server and database, and 2) the user interface of the module presents a search field 202 configured to receive content of the query from the user device and then to bring back a listing of opinion poll topics and their associated statistics that the user of the client device may be interested in reviewing based on the content supplied in the query. For example, the module might present the Top Ten opinions for that day to any user viewing the site and increase the interest factor based on the particular user's location, current time, and previous subject matter or opinion levels expressed. Note the search field and subject matter field 202 may be the same field but different actions occur based on subsequent actions. For example, when the search field icon is activated/clicked, for example by a mouse or finger tap on a touch screen, then the server retrieves similar opinion surveys. However, when an opinion level icon 208 is activated then the client application sends the content in the subject field 202 along with all of the other associated data to the server for tallying.

Upon the server returning opinion lists or the user typing in a subject matter free form, the user chooses the subject matter about which he is interested to express an opinion, or in the case of a search which opinion statistics (of other users opinions) he/she is interested in reviewing. For example, the server categorizes and associates similar subject content to the content in the subject field 202 and sends that similar subject content back down over the network to the client application on the client device. The user could select an existing survey to review and potentially add their cast opinion on, start their own new survey on that subject matter, or slightly amend the subject matter of the survey to address and start a survey targeted at a specific feature of the general subject matter that the user wishes to create an opinion poll on. For instances, the general subject matter that the existing survey is on could be a restaurant and that subject matter may be populated as a list of possible topics for the user to choose and/or pre-populated into the subject field 202 as text for the user to choose based on a location of the client device, a completion of any logical extensions of the text being typed into the search field, etc. However, the user of the client device may want to specifically start an opinion poll on the hamburgers at that restaurant; and thus, would amend the words in the subject field 202 to specifically discuss the hamburgers at that restaurant. Thus, a user can easily search for, or express opinion about, the exact subject (e.g., 'Joe's Bar & Grill Hamburgers', 'noise level at Sundance Steak House', 'Obama's foreign policy', 'Jack the bartender's jokes', 'The King's Speech music score', 'Lady Gaga's hair', etc.

The module may be scripted to allow the user to decide the subject matter of the opinion poll by two or more of the following 1) the putting in of text or symbols in the subject field 202 either by the user typing in words or accepting the pre-populated suggested words supplied from the server, 2) the user speaking the subject matter of the opinion poll into the microphone of the client device, and the application using a speech to text routine to populate the subject field 202, 3) the user scanning an object to be the subject matter of the opinion poll by swiping the mobile client device against the object and a sensor inside the mobile device using Near Field Communication (NFC) or Radio Frequency IDentification (RFID) technologies recognizes that object and/or reads the object's ID code to populate the subject field 202, 4) the user taking a picture of an object with the phone camera built into the client device and the client application is scripted to pass the image of the object for image recognition by the server and database, and 5) other similar methods. The server then sends down a list of one or more subject matters and their suggested words to populate the subject field 202 based on relevancy to the recognized object in the picture. In an embodiment, the subject field 202 is populated with a textual and/or symbolic representation of the subject matter of the opinion poll with any of the four above ways, and the user is allowed to override or amend the populated text and symbols with the specific words the user wishes to be the subject matter of the opinion poll which he is initiating and/or in which he is participating.

The module receives confirmation that the subject matter of the opinion poll is chosen by the user by activation of one of the opinion level buttons 208, activation of the subject field icon 202, or some other method discussed in more herein. In an embodiment, when the module receives confirmation that the subject matter of the opinion poll is chosen by the user, then the module offers the user with a limited number, less than ten, of opinion level buttons (e.g., 4-5) 208, which an activation/pressing of a given opinion level button registers a certain level of opinion (e.g., "bad", "so-so", "good", excellent"). The activating of that opinion level button is recognized by the module to both set the subject matter of the opinion poll and the user's opinion level, and the module then transmits the subject matter, opinion level, the time and date, available user demographics, and any client device sensor information collected by the module over the network to the server.

The module may also be configured to allow the user to express an opinion level by two or more of the following 1) by activation/one mouse click of any of a 'limited number of'/ 'constrained set of' three or more opinion level button icons but less than ten opinion level button icons 208, 2) by a software routine resident in the client application that translates detected tapping on the mobile device into a selection of a specific opinion level icon (e.g., one tap thru four or more taps is translated to "bad" thru "excellent"), and 3) by a software routine resident in the client application that translates a detected amount of force in a shake of the client device, gently or roughly, into a selection of a specific opinion level icon 208, then the application resident on the client device collects this information and communicates this opinion level/rating on the subject matter of the opinion poll over the network to the server. The server then passes this information onto the database. The user has expressed an opinion level of his/her approval or disapproval about the exact subject matter that the user desires including any segment, part or the entire program/service/product, voluntarily and without having been prompted for that opinion.

Referring to FIG. 1, each client device 110A-110C can communicate the content entered into the subject field of the user interface to set the name and subject matter of the opinion poll over the network to the server 105A-105C potentially located on the World Wide Web. A software program resident on the server, such as the first server 105A, takes in the details of the opinion poll. The backend server aggregates the opinion level expressed by activating/pressing the opinion level button with all of the cast opinion levels previously submitted by users of different client machines 110A-110C on this opinion poll. The information is passed to the database. The server then checks the database to see 1) if the subject content, exactly as chosen or expressed, exists in the database as well as 2) if similar titles of subject content exist in the database. Thus, a software program resident on the server is coded to take in the details of the opinion poll, aggregate those details with any opinion poll data for this opinion poll stored in the database, and categorize those details. The server then feeds this information back to each client device to be displayed on a display screen of that client device as well as feeds this information back to providers/paying customers. Each time an update occurs to the opinion poll the server may merely feedback the updated polling information to client device casting an opinion level or all of the client devices that have cast a vote on that opinion poll. The web application on the server can cooperate over a wide area network, such as the Internet or a cable network, with two or more client machines each having resident applications.

Referring to FIG. 2, the server returns the existing opinion polls in a list presented by the application for the user to select from if they choose, and when an existing poll is selected by the client device, the server returns the existing opinion poll and its statistics appear in the form of a chart (bar, graph, etc.) If there are more subjects which names partially match the user selection (e.g., "Starbucks Latte Taste", Starbucks Latte Price", etc.), then user will get a list of all options, which he can choose from or add to (e.g., "Starbucks Latte Calorie Content", or "Starbucks Latte Taste During Christmas", etc.).

When the user's opinion has been captured by a server applet resident on the server, the server applet sends back an acknowledgement (a sort of feedback, light, message, etc.) to the browser of the client device indicating that the opinion was captured. The server applet sends back an updated chart graph of the opinion poll to be displayed on the display screen of the client device. The updated chart indicates at least a number of times each particular opinion level rating has been cast and what the total aggregate number of opinions cast are. Thus, after the user activates the particular opinion icon, the application on the server sends the tally information from the database to the application resident on the client device to immediately display of the results in easy to understand and compare chart formats (e.g., bar, pie, etc. with simple but powerful data such as the number of times each particular opinion level rating has been cast and what the total aggregate number of opinions cast are, without a complicated listing of user text based comments to filter through. (See FIGS. 2 through 4).

Note, the physical characteristics of the hard/soft opinion level buttons 208 such as shape, color, graphical/textual labels, industrial design, etc. will be associated with the opinion level types that might be expressed using, and captured by, the system (e.g., 'outstanding', 'good', 'bad', 'terrible', etc.). Thus, a computer operator using a web browser type application is provided by the system a simple means, such as utilizing a hand-held appliance or software running on a 3rd party device (e.g., an iPhone, other mobile phones, a PDA, a browser, a TV remote control, a computer, etc.) consisting of a number of ways to choose a subject for the opinion poll and expression through these few hard/soft 'opinion/action buttons.

Referring to FIG. 1, a user interface of the website serviced by the server allows business partners as well as users of client devices to view statistics in real-time in two or more of 1) a recorded profile of the opinion poll data, 2) an analyzed profile of the opinion poll data, 3) a raw profile of the opinion poll data, and 4) other formats, which allows business partners to search the opinion poll data by date, opinion level, and other parameters to provide real-time market research. The user interface of the client device can offer a series of useful business choices based upon a subject matter of the opinion poll including 1) statistics of opinions on similar subjects or other businesses in the neighborhood, 2) presentation of relevant advertisements on the display of the client device directed by a business partner of the website, and 3) presentation of coupons on the display of the client device that the system determines the user may be interested based on 1) voted likes/dislikes, 2) current location indicated by GPS relative to the business address, 3) demographics of the user of the client device and 4) other similar information. Thus, the system provides users, active or passive, a variety of useful tools such as a "Top Ten" lists of most expressed opinions, best of in that category, worst of in that category, coupons, topic options, etc., all by category as well as based on automatic category selection which itself is based on the user's automatically sensed data (e.g., location, previous opinions expressed, etc.). The business partners can influence the data passed to the user by the system to allow a highly focused customer reach for that business partner based on the user of the client device likes/dislikes, location, and demographics collected at the instant of customer engagement with a product or service.

For example, a business partner such as a restaurant could set up many opinion polls on aspects of their business. The server sends all of these already existing opinion polls to the user of the client device when they are near or at the restaurant. The restaurant obtains opinions and reviews of others' opinions on the restaurant. The application on the server offers statistical analytical tools to the business partner to search by date, opinion level etcetera to obtain more specific feedback than text based comments. For instance, the restaurant may see that on Tuesdays indicated by the dates of the opinions, the comments on the food at the restaurant are lower than other days. In addition, this is an easy way to define top opinion choices (survey items) for customers who are visiting the business. The restaurant customer survey automatically pops up on the smart phones at the restaurant based on the location of the client device and having the client application active. This automatically replaces a paper survey methodology at a very low cost. Businesses can also bench mark their own data vs. other businesses' by type, location, date, customer type, etc. For example, a chain restaurant management may find that in their restaurant location #4 people are happier with food than their other locations, while their restaurant location #7 seems to have the most complains about "service", or that overall their restaurants get lower user opinion ratings regarding "food" than restaurants within one mile of their restaurant locations.

In another embodiment, the application resident on the client device is scripted to start recording through its microphone an audio track and then communicates the audio track from a movie or other audio program along with a current date and time indicated on the client device over the network to the server potentially with other information including GPS of the client device. The server may optionally return a selectable list of movies playing at that GPS location, and/or TV or Radio shows playing at that current time, to the client device to assist the user in identifying the source of the audio track. The server cooperates with the database to identify the source of the audio track that the microphone of the mobile device picked up by trying to find the same audio track in the database. The server then attempts to match the time-synchronized portions of the same audio track in the database to the audio track that the microphone of the mobile device picked. The user interface also captures the user's activation of the opinion icons expressing their likes or dislikes with portions of the audio track that corresponds to segments/scenes within a movie or TV show. Thus, the user of the device casts an opinion level with time stamps on one or more segments within the movie, TV show or radio show and then the segment supplied from the client device is matched up with the same time segments of the audio clip stored in the database, which then can be correlated to a particular scene within the movie, Radio show, or TV show, and the opinion level icons cast on that segment of show are tallied and posted like other opinion polls.

The server that hosts the web site also is scripted to facilitate downloading of the client applet to the client machines, directly or indirectly through another server site. The applet may also have built-in coding to be virally replicated to be spread across multiple social network platforms and coded to be properly placed within a structural organization of each social network platform with the viral coding specifically scripted to facilitate embedding the client applet within the media space. Each instance of the applet may allow the new instance to be passed along as a viral instance to 'friends' to allow other members of that social network cast their vote on the poll as well as friends visiting the personal profile page where the new instance is hosted can also cast their vote.

The user of the client device has 100% control over 1) the time when to initiate the survey, 2) the place to initiate the survey from a mobile wireless computing device, a mobile phone, a desktop wired into the internet, or even a handheld remote for expressing an opinion on consumer products in a store, and 3) the subject matter of the opinion poll.

In an embodiment, the user interface presents only a simple subject field on which the subject matter of the opinion poll will be on. The user is enabled to set the opinion poll on even a specific sub-feature of a given subject by filling in the text of the subject field and after the subject field is populated, then the client application changes a state of the set of opinion level button icons to allow one of them to be activated by the user to cast their opinion rating/level on the subject matter of the opinion poll. No text box is presented to the user for the user to make additional comments, which later on is hard to read and search through for later users to obtain relevant information from. Further, no need to type lengthy sentences with commands on smartphone keypads, or sift through lengthy opinions. Thus, the expressed opinion level about the subject matter of the opinion poll is encompassed by the user activating, such as pressing, one of the opinion level buttons and the client application passing at least this information to the server and database for tabulation.

Figure 3:
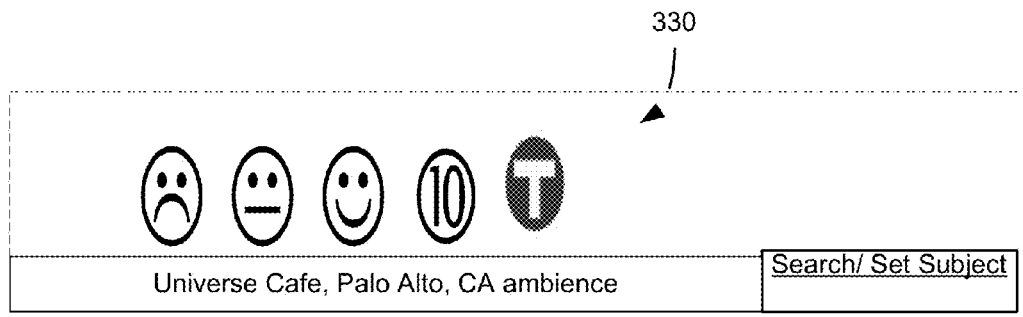
FIG. 3 illustrates a diagram of an embodiment of a plug in type application to implement the user-initiated opinion polling system.
Figure 3:
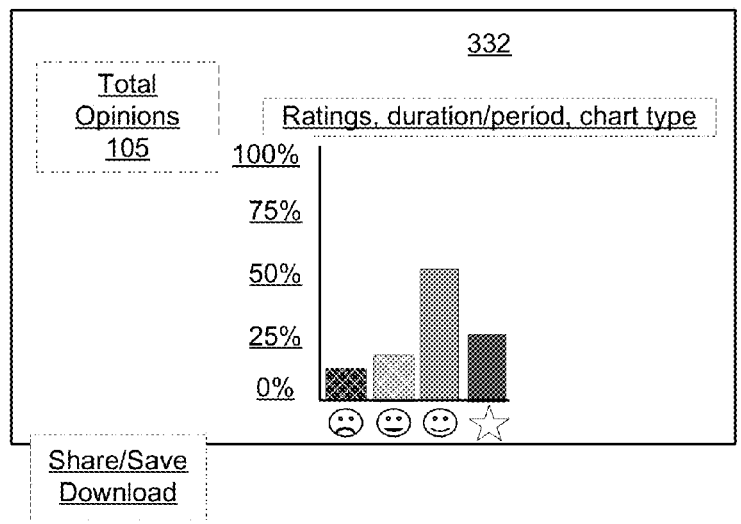
Figure 4:
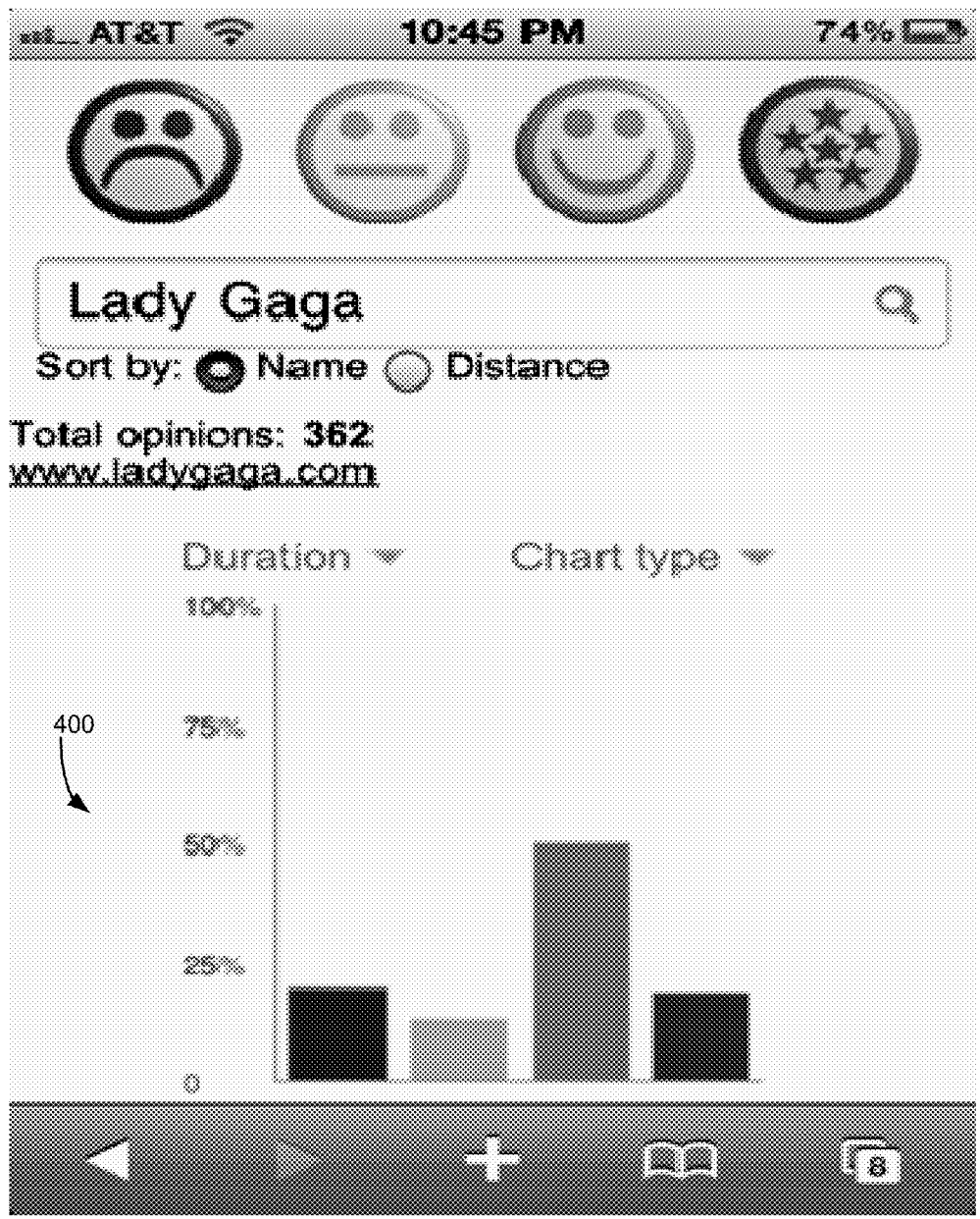
FIG. 4 illustrates a diagram of an embodiment of an opinion poll presented by a module to a user of a client device.

FIG. 3 illustrates a diagram of an embodiment of a plug in type application to implement the user-initiated opinion polling system. An internet plug in application is configured to work with a browser of the client device and the server to offer an Internet user viewing a web page a small transparent mouse-controlled movable overlay graphic 330 representing soft buttons that indicate multiple selectable opinion level iconic choices (e.g., 'outstanding', 'good', 'bad', 'terrible', 'view opinions', etc.). The overlay 330 may detect the subject matter of the opinion poll by interrogating the web page, through any of image analysis, Optical Character Recognition, analyzing the coding structure of the web page, or 2-D spatial referencing of the specific location of the web page being viewed, and thus, the user can 'move' the overlay by dragging it to anywhere on the web page and then press/click one of the soft opinion level buttons to take an action such as expressing his/her voice/opinion about the specific content or portion of the web page located immediately under the overlay at that moment, and the subject field will be pre-populated by text supplied by the server corresponding to the overlaid subject matter. The user can amend or override the populated text, and the application then sends the opinion level, subject matter of the opinion poll.

Opinions expressed by pushing the opinion buttons along with other information such as the specific location of the web page on which the overlay was located at the time of the buttons were pushed, a content tag which maybe some of the content under the overlay, the URL, user demographics, etc. are then sent to the 'opinion collection/dissemination website' on the Internet for storage and utilization in different ways later. Additionally, after an opinion is cast, the plug in may display the tallied results 332 to the client.

Once again, pressing the 'view opinions' soft button on the overlay opens a larger non-transparent window, which contents are requested over the Internet from the 'opinion collection/dissemination website', displaying historical opinions expressed by other users about the content of the particular location of the web page on which the overlay/window is placed and/or the entire page/subject displayed, offering the user the options to view opinion statistics, other users' comments, blogs, links, etc. and to add his/her own comments if he/she so chooses.

In an embodiment, the server applet may be embedded into a third party's media space, such as an HTML web page. A browser from a client machine may interact with the web page that contains the embedded applet, and then spot the voting buttons presented by a user interface of the applet. The web page may be served by a web server on any HTML or WAP enabled client device or any equivalent thereof such as a mobile device or personal computer. The server serves pages that allow entry of demographic details and further pages that allow entry of comments, etc.

Additional Points

In an embodiment, the client device that runs a browser or browser-like feature with the application as described above sends the opinion level of a user along with relevant the information, such as those about the product or service that is the subject of the opinion and time/date of the opinion, etc., to a server to maintain the opinions and keep a profile of the opinions. The application in the client device may have a detector routine scripted to detect other applications on the client device as well as sensors built into the client device, and then capture information from these other applications and the sensors, and when the user wishes to express an opinion the application then transmit this sensor data and other resident application information along with the subject matter and opinion level information from the client device over the network to the server. The client device sensory information may include two or more of the following (e.g., Global Positioning System (GPS) information, Radio Frequency IDentification (RFID) information, Near Field Communication and other similar sensors) and the sensor data is passed to the server so that the application on the server can look up subject matters in the database close to this user's location, and/or closely related to the ID of this object to help the user to set/choose the subject matter of the opinion poll more easily by sending a list of suggested subject matters in a drop down menu or by pre-populating the subject field with these relevant words.

Some additional sensory information transmitted can include: user information—location, demographics, etc.; location; time index stamp (e.g., minute 23 of the movie, concert, speech, or other event); picture; barcode; URL; Near Field Communication; Opinion time stamp; device and opinion authentication information; and other similar information.

For example, using the GPS information available to the device the user is using in conjunction with the channel number of the TV program the user is watching and the day/time information, the system can, using the data available on the world wide web, figure out exactly what part of which TV program the user is expressing his/her opinion on. The determination of the subject matter about which the user is expressing his/her opinion could also be done as a combination of user selected (e.g., by inputting or selecting from a menu of options information) and the system's automatic enhancement of the information (using the GPS, RFD, NFC, etc. data) to figure out the exact subject matter about which opinion(s) is/are being expressed. Using NFS (Near Field Communication) or any scanning technology, the user can choose a subject, or be aided in choosing a subject, also by touching, swiping, or moving his/her device in the proximity of something. The subject may also be chosen by the user speaking it in to a microphone on his device, which can recognize speech and convert it to computer data format.

The media space, client applet, and resident software program cooperate to gather data not on whether a particular program/service/product is being watched/browsed at but also allows communication on how the person(s) watching/viewing that particular program/service/product feels about that particular program/service/product.

One or more taps on the phone allows some smart phones equipped with sensory devices, such as an accelerometer, to translate an opinion level to the buttons described above. In such cases one or more taps on the phone, or a gentle vs., strong shaking of the phone could replace the user's pressing of the iconic buttons to express his/her like/dislike of a subject.

On the resident client applet, once a button is pressed a unique code consisting of information about the event (e.g., TV channel/movie being watched, program time, time of the specific opinion expression, event code(s), the customer demographics, etc.) as well as the button ID may be sent in real time, or later, to a website for real time or delayed viewing, analysis and dissemination in a variety of user-defined or automatically selected mechanisms/formats including but not limited to search-based, sorted, listed, graphical, text, animated, overlay on other programs/event-related information, pictures, video, audio, etc.

The system may also use an Appliance-Website Combination. The appliance enables the user to indicate expressions or provide opinions related to an event such as a broadcast TV/radio program, movie being watched in a movie theatre, live theatrical play, sporting event, concert, or lecture, in real-time, as freely, easily and frequently as the user desires without ever being prompted, requested for or questioned for that opinion. The appliance can take different forms including any device that runs a web browser or a subset of a browser capable of communicating with the world wide web, a smart phone such as an iPhone or Android running a browser or the special coded applet, a hand-held device, buttons on cable/satellite remote controls, a PC/PDA/Mobile, etc.

The web site collects all users' expressions in a privacy-friendly manner, stores, statistically analyzes and presents them to the visitors of the site and/or partners (e.g., the broadcasters interested in the data). The website is scripted to present the data in real-time or stored fashion in raw or analyzed formats. The website is scripted to provide advanced statistical data search functions. The website is scripted to enable users to establish personal opinion profiles, links to social network sites, opinion event-based alarms, etc.

The web site features a routine scripted for search & view opinions/statistics on events (in progress or recorded). The user interface presented allows the search by name, time, zip code, broadcast channel, station, program name, program segment, time-counter, opinion quality/quantity, etc. The web-site cooperates with broadcasters to detect for more program tags such as character lines, subject matter discussed, etc. and those tags can be included as part of the reported statistics. The user interface of the website allows content partners as well as consumers to view statistics in real-time or recorded, analyzed or raw, sorted per profile or otherwise specified, etc.

The user interface of the website presents screens to a browser of a client machine to allow a user to Create/Manage/View a voting profile/history, which linkable to, and shareable with, a social network profile page on Facebook, Twitter, MySpace, etc. The user interface of the website allows a user to have real-time viewing of friend's votes, voting/viewing habit/profile, etc. A tracking routine resident for the website sends automated programmable alert message transmission (e-mail, text, etc.) to self or 'friends' and 'followers', e.g. letting them know about the poll/opinion and giving them the opportunity to express their vote. The tracking routine sends the message to friends, and/or the followers, if the user likes a particular program, or program segment, beyond a certain previously defined likeability threshold. The tracking routine may send e-mail messages to the broadcasters, etc. about programs or program segments.

The tracking routine may obtain its input from an aggregation module on the website. The aggregation module monitors one or more ports on the server that are sent this information on the poll from the client machines/appliances. A few hard/soft 'opinion/action buttons', for an applet resident on a client machine exist to express an opinion or voice his/her approval or disapproval of/about any segment, part or the entire program/service/product voluntarily and without necessarily having been prompted for it. The server hosts the aggregation module that cooperates with the applets on the all of the client machines/appliances. The server also hosts an associated web site where the results of the opinion are posted and aggregated with other opinions on the same program/service/product. Later an intelligence engine at the server can match up semantically similar concepts when displaying this survey result and other similar semantically similar surveys. A wizard on the website is configured to assist the browser of a user on a client machine to download the applet from the website.

The website references a database of content/service/product providers and gives feedback about the content/service/product directly to these content providers as well as publishing the opinions on the website and distributing the published opinions/survey results be viewable in various social networks.

The opinion level buttons may be augmented with a view opinion button. Pressing the 'view opinions' soft button on the overlay opens a larger non-transparent window, which contents are requested over the Internet from the 'opinion collection/dissemination website.

In the movable overlay graphic embodiment, pressing the 'view opinions' soft button on the overlay opens a larger non-transparent window, which contents are requested over the Internet from the 'opinion collection/dissemination website', displaying historical opinions expressed by other users about the content of the particular location of the web page on which the overlay/window is placed and/or the entire page/subject displayed, offering the user the options to view opinion statistics, other users' comments, blogs, links, etc. and to add his/her own comments if he/she so chooses.

The system enhancing on-line opinions as well as enhancing other media space opinions with appliances allows framing of the question and a survey for the opinion poll to be either very specific or very loose by allowing the user to select free form what they are expressing their opinion on, and type in the question and/or survey subject. Later the intelligence engine at the server can match up semantically similar concepts when displaying this survey result and other similar semantically similar surveys. Thus, this leaves no opinions unheard and value un-realized. The system accurately reflects opinions of young viewers, minority viewers, as well as adult viewers and non-minority viewers by tracking which users are voting. If the user is not a previous user of the system, then the user interface presents a screen to obtain the demographic data from the user voting on the poll. Since the applet may be virally spread from one user to another user, the system can use live video streaming, polling and blogging techniques to combine qualitative and quantitative survey capabilities. The system conducts surveys for clients to understand how the public is thinking or reacting to major issues on a national or international scale. The system provides feedback services to content providers and to a social network. However, this feedback from the user is not solicited i.e. the button may be embedded by a user/consumer and then the user may give their unsolicited opinion.

Additional Embodiments

Example Command Receiver/Re-Transmitter Device

Figure 5:
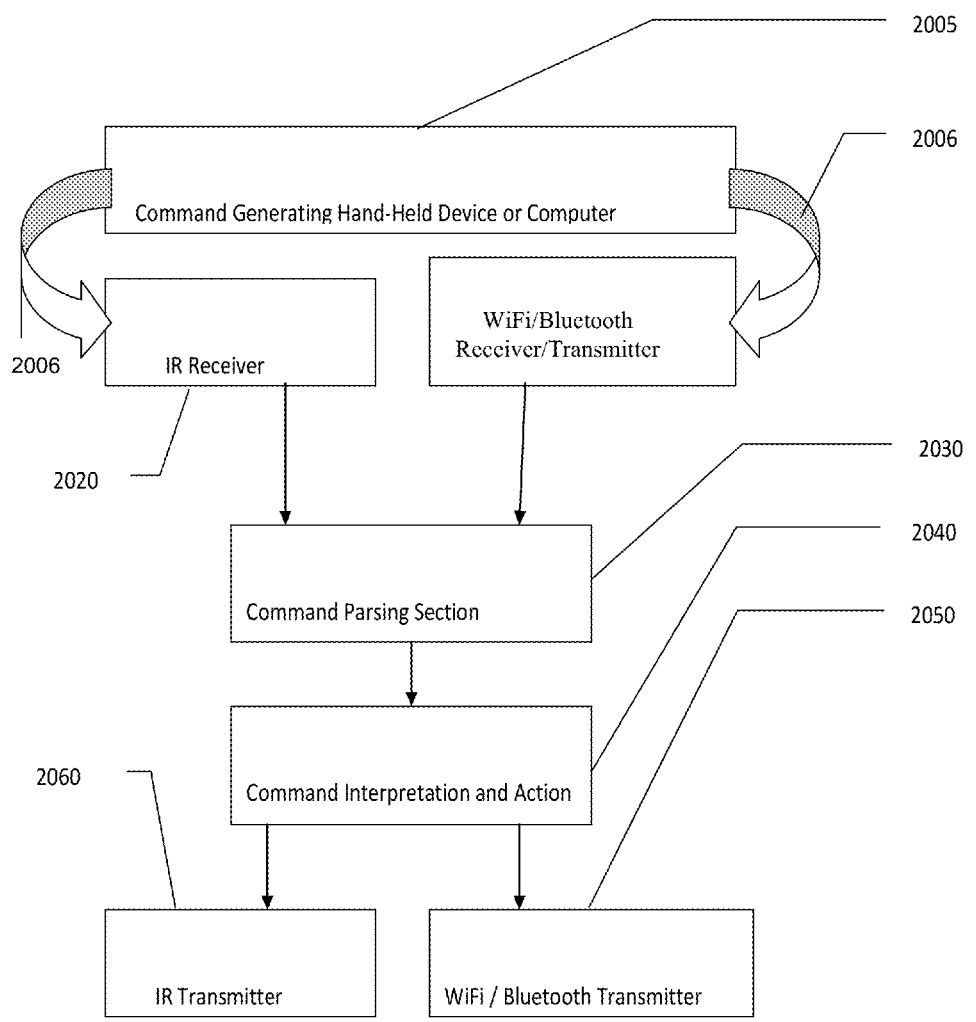
FIG. 5 illustrates a diagram of an embodiment of the user-initiated opinion polling system on a receiver/re-transmitter device.

FIG. 5 illustrates a diagram of an embodiment of the user-initiated opinion polling system on a receiver/re-transmitter device. In another embodiment, a receiver/re-transmitter device enables the operator of a control device (e.g., an infrared hand-held remote, a PC, a Laptop, a PDA, or a mobile phone running a remote control application) to use the said control device to issue voting commands (e.g., ⊗ ☹ ☺ ⑩ ✪ , etc.) as well as other typical control commands such as program selection, channel selection/change/up/down, ON/OFF, etc. to a TV, cable or satellite TV receiver that only has an infrared input interface. The Infrared/Wi-Fi/Bluetooth command receiver/re-transmitter device intercepts commands, interprets them, stores a copy in its memory for future use, sends the appropriate voting codes (e.g., ⊗ ☹ ☺ ⑩ ✪ etc.) to the world wide web server (to be stored, analyzed and later disseminated), and re-transmits the rest of the commands, using its Infrared transmitter, to the TV, cable or satellite TV receiver for which the command was initially intended by the operator of the control device. The Infrared command receiver/re-transmitter device is physically placed in front of the TV, cable or satellite TV receiver's Infrared receiving port such that both conditions below are met.

1) The receiver/re-transmitter device's Infrared transmitter has direct line of sight to the TV, cable or satellite TV receiver's Infrared receiver port.

2) The receiver/re-transmitter device also blocks the Infrared receiver port of the TV, cable or satellite TV receiver such that only the signals it (the receiver/re-transmitter device) sends can be received by the TV, cable or satellite TV receiver's Infrared port. Blocking the line of sight of any other Infrared signals to the TV, cable or satellite TV receiver port will ensure that only the signals that go through, and are re-transmitted, by the command receiver/re-transmitter device get to the intended target (TV, cable or satellite TV receiver), preventing undesirable interferences between different Infrared transmitters.

The logical operation of such device is provided in FIG. 5, which outlines an example infrared commands and information in the receiver/re-transmitter device.

In step 2005: Any device (e.g., an infrared remote control, a PC, a Laptop, a PDA, or a mobile phone running a remote control application) that is capable of issuing commands (using an Infrared, Bluetooth or Wi-Fi interface) can, at any time, issue a voting command (e.g., ⊗ ☹ ☺ ⑩ ✪ etc.) about the program being viewed, or a typical TV control command (e.g., channel change, program selection, volume control, ON/OFF, menu, information, on-demand, etc.) to control a TV, cable or satellite TV receiver that is only infrared enabled, provided that the actual command codes issued are those defined by the target device manufacturer.

In step 2006: Commands issued by the device described above (e.g., an infrared remote control, a PC, a Laptop, a PDA, or a mobile phone running a remote control application, etc.) are transmitted over the airwaves (using Infrared, Bluetooth or Wi-Fi technology).

In step 2010: The Wi-Fi or Bluetooth interface receives the commands (in bi-directional mode it also issues all necessary handshake and other protocol conforming commands as needed).

In step 2020: The Infrared receiver receives the commands (in bi-directional mode, if applicable, it also issues all necessary handshake and other protocol conforming commands as needed).

In step 2030: The received commands are parsed and the actual codes identified by the system.

In step 2040: The Command Interpretation and Action Module interprets each command to identify the action(s) that are to be taken by the system, if any. This may be done using a system that utilizes a two-dimensional finite state machine. In the cases that the command is a voting command (e.g., ⊗ ☹ ☺ ⑩ ✪ , etc.) the required action is generally sending the vote code along with the information of the channel/program that is being watched, the time/day and any other relevant and available demographics to the server on the worldwide web. This is done using the Voting/Voicing Device Communication Format discussed earlier. A copy of all commands is locally saved in the memory so that the system always knows what channel is being watched (was last selected by the operator) and what program is being watched and/or being voted on.

In step 2050: The Wi-Fi/Bluetooth transmitter transmits the commands it has received from the Command Interpretation and Action Module, in most cases in essence "re-transmitting" what was received by the Infrared, Wi-Fi or Bluetooth receiver(s) described earlier.

In step 2060: The Infrared transmitter transmits (in essence "re-transmits") the commands it has received from the Command Interpretation and Action Module. In most cases, they will be identical to those issued by the operator, intended for the TV, cable or satellite receiver, and received by the Infrared receiver of the command receiver/re-transmitter device in module 2020.

Figure 6:
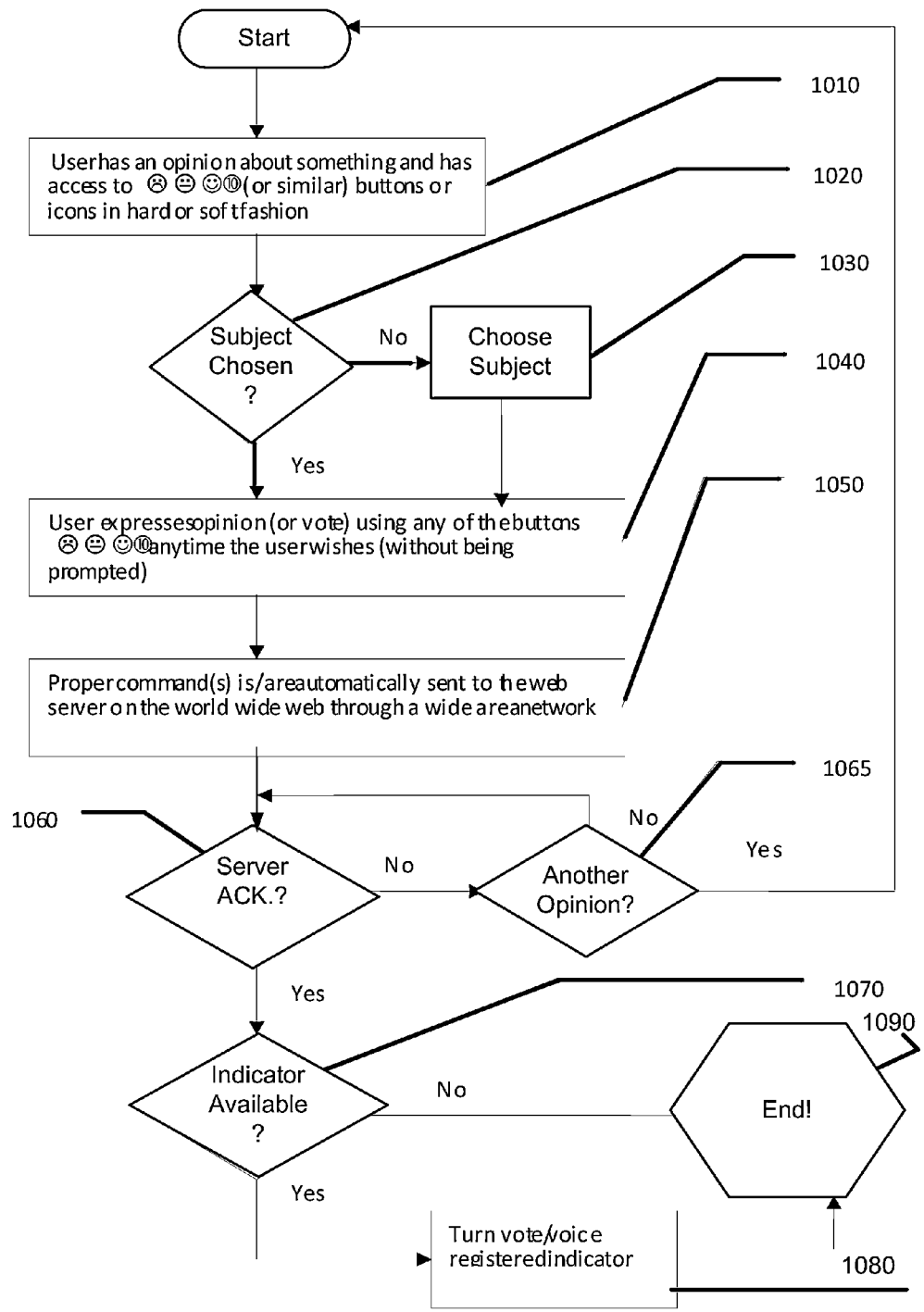
FIG. 6 illustrates a diagram of an embodiment of a user expressing an opinion in the client device and its application command structure.

FIG. 6 illustrates a diagram of an embodiment of a user expressing an opinion in the client device and its application command structure.

In step 1010: A user of a product or service is provided software- or hardware-based access to opinion expression buttons such as: ⊗ ☹ ☺ ⑩ or similar buttons. These buttons may be provided to the user on his personal computing or communication device (e.g., a mobile phone, PC, laptop, desktop, browser running on a device, a PDA running a browser or running a downloaded application, a TV/satellite remote control, a mobile phone that can communicate with the world wide web, any other hardware or software device with ⊗ ☹ ☺ ⑩ ✪ opinion level buttons, etc.) The product or service of interest to the user, which may or may not be in use by the user at the time could be: 1) anything physical (e.g., a retails stores consumer product, a point of sales display, a billboard, etc.), 2) anything in the cyberspace (e.g., a web page, a website, software package, etc.), 3) an entertainment item (e.g., broadcast or recorded TV or radio program, cable, satellite, videogame, etc.) 4) anything else, physical or logical, a user may want to express his like/dislike about. The user desires to express his/her opinion about the product/service, or a particular part of the product or service (e.g., a moment in the TV program, a specific location/content of a web page, a particular item on a restaurant menu, a particular item on a retail point of sale display, etc.) and knowing that he has access to ⊗ ☹ ☺ ⑩ ✪ buttons he understands that he can, utilizing the said buttons, express his like/dislike or opinion about the subject.

In step 1020: When the user presses one of the opinion expression buttons (e.g., ☹ ☺ ☻ ⑩ ☻ etc.), a specific subject is chosen, by the system automatically, or by the user manually, or a combination of user input and system figuring out certain subject-related information automatically.

In step 1030: Selection of the subject matter about which the user expresses his/her opinion can be done manually by providing the user with a means to input a subject code tag associated with the subject matter, or entering relevant information (e.g., program name, channel number, webpage URL, etc.) or by the system automatically determining on what item or subject the user is expressing opinion. For example, using the GPS information available to the device the user is using in conjunction with the channel number of the TV program the user is watching and the day/time information, the system can, using the data available on the world wide web, figure out exactly what part of which TV program the user is expressing his/her opinion on. The determination of the subject matter about which the user is expressing his/her opinion could also be done as a combination of user selected (e.g., by inputting or selecting from a menu of options) information and the system's automatic enhancement of the information (using the GPS, RFD, NFC, etc. data) to figure out the exact subject matter about which opinion(s) is/are being expressed. Using NFC (Near Field Communication) or any scanning technology, the user can choose a subject, or be aided in choosing a subject, also by touching, swiping, or moving his/her device in the proximity of something. The subject may also be chosen by the user speaking it in to a microphone on his device, which can recognize speech and convert it to computer data format.

In step 1040: Once the subject matter is chosen and available to the system, the user's pressing of any of the opinion expression/voting buttons (e.g., ☹ ☺ ☻ ⑩ ☻ .) will cause an opinion about the specific item to be sent to a website where it will be further stored, disseminated, statistically analyzed, presented to users through the worldwide web, etc. As an alternative to pressing the iconic button, in some devices and modes the user can tap on the device, or shake the device gently vs. roughly (or anything in between) to express the same meaning of the iconic buttons. In these devices, the software assigns a tap or gentle shake to the button at one end of the opinion spectrum and four or more taps or rough shake to an opinion at the other extreme end of the opinion spectrum, while automatically training itself to assign intermediate number of taps or shakes to the corresponding intermediate opinions.

In step 1050: Sending the user opinion information can be done by any device, on or off the Internet, utilizing a command structure of the kind described in section "Device Voting/Voicing Device Communication Format".

In step 1060: Once the user opinion expression/vote is sent to the website, the system continues to monitor responses from the www server in form of an "Acknowledge or receipt of valid opinion/vote". Receipt of such acknowledge is not required as the server system may or may not always send such acknowledge responses. If the server does not send an 'Acknowledge' message, the opinion expression system will continue to monitor the server initiated communication until such time as either an acknowledge is received or the user initiates another opinion expression process, which will start the whole process from the top again.

In step 1065: If an acknowledge is not received but the user has initiated another opinion expression session by pressing one of the buttons: ☹ ☺ ☻ ⑩ ☻ , the process will start again for the new opinion being expressed.

In step 1070: If an 'Acknowledge' is received, the system checks for availability of a mechanism to identify the user of the receipt of the acknowledge message from the server (e.g., an LED, a software icon, a light, vibration, tone, beep, audio or visual message, etc.).

In step 1080: If a mechanism such as one described in section 1070 exists, then the system utilizes that mechanism and the user is identified of the server acknowledge (e.g., tone sounded, icon appears, message sent/appeared, LED goes ON, etc.).

In step 1090: Once a command that contains a user expression or vote about an item has been sent to the server, and regardless of reception of an acknowledge or such acknowledge having been communicated to the user, the opinion expression/voting system is ready to accept another user opinion about another subject, item, or the same, again.

Voting/Voicing Device Communication Format

Different devices can communicate with the server through the Internet or other wide area networks such as the telephone or mobile phone networks. In addition to following the existing necessary applicable protocols (e.g., TCP/IP and H/XTML for the Internet, Text SMS protocol for mobile devices, etc.), each voting/voicing device sends certain command(s) and voting/voicing information to the server each and every time a user decides to express an opinion or vote about or on an item. The size of the command codes are variable and not necessarily similar. The logical format of each command is described below; however, the command structure described below can both be expanded to contain more sections, or shrunk to include fewer sections as necessary.

| Serial Number | Command Segment Content |
|---|---|
| 1 | Command ID Code |
| 2 | Number of Command Sections to Follow |
| 3 | Voting Device Type ID/Name (e.g., Mobile Phone, Browser, TV Remote, other appliance, etc.) |
| 4 | Voted Item Specific ID (Descriptor, Web content, product/service/event name or code, URL address, etc.) |
| 5 | Specifics of the Voted Item (e.g., tag, specific web page location or link, etc.) |
| 6 | Actual Vote/Opinion Code (e.g., ☹ ☺ ☻ ⑩ Buttons) |
| 7 | Vote Demographics (e.g., Date/Time, GPS, User ID, Event-Indexed Time Stamp, etc.) |
| 8 | Vote Code (e.g., a unique number associated with this vote, assigned by the voting device) |
| 9 | End Vote Command ID |

DEFINITIONS

1) 'Command ID Code' specifies that the following parts of the packet(s) are associated with the voting/voicing opinion product/service. It also includes automatically generated codes that will be used by the server to authentication of the command as one generated by a user or a computer, etc.
2) 'Number of Command Sections to Follow' specifies how many command sub-section this command packet contains
3) 'Voting Device Type ID/Name' specifies what the device that is sending the command to the website is, such as a mobile phone, browser, a TV/Satellite remote control, a voting appliance, etc.

4) 'Voted Item Specific ID' specifies about what item the user, using the device, is expressing opinion. Examples are a specific location, item, person, an attribute of a person's, thing's or location's, location/item of a web page, an event, a broadcast, a movie, play, and event, a physical or imaginary item that has been assigned a 'tag' to identify it for voting/voicing opinion, ANYTHING, ANYONE, ANYWHERE. This could also be a URL or any other item/event/content tag/ID.
5) 'Specifics of the Voted Item' further describes the item being voted on.
6) 'Actual Vote/Opinion Code' specifies which user expression button (e.g., ☹ ☺ ☺ ⑩ ) was chosen by the user.
7) 'Vote Demographics' specifies the exact time of the vote, expressed in local date/time format (e.g., Jan. 2, 2013, at 4:21:45 PM), event-indexed time stamp which is the time within the event, indexed from the start of the event (e.g., at minute 21 and 33 seconds from the start of the event) followed by other demographics information that might be available to the device to send such as: geographical location information or GPS information, User ID (if the user is registered with the service and/or is willing to provide this information voluntarily), etc.
8) 'Vote Code' is a unique number associated to this vote by the voting device. It is intended to prevent multiple counting of the same vote coming from the same device if so desired by the server.
9) 'End Vote Command ID' identifies the end of this command packet.

Example: expressing a 100% user-initiated opinion on a web page or specific Content of a web page using the buttons ( ☹ ☺ ☺ ⑩ ✪ )

Figure 7A:
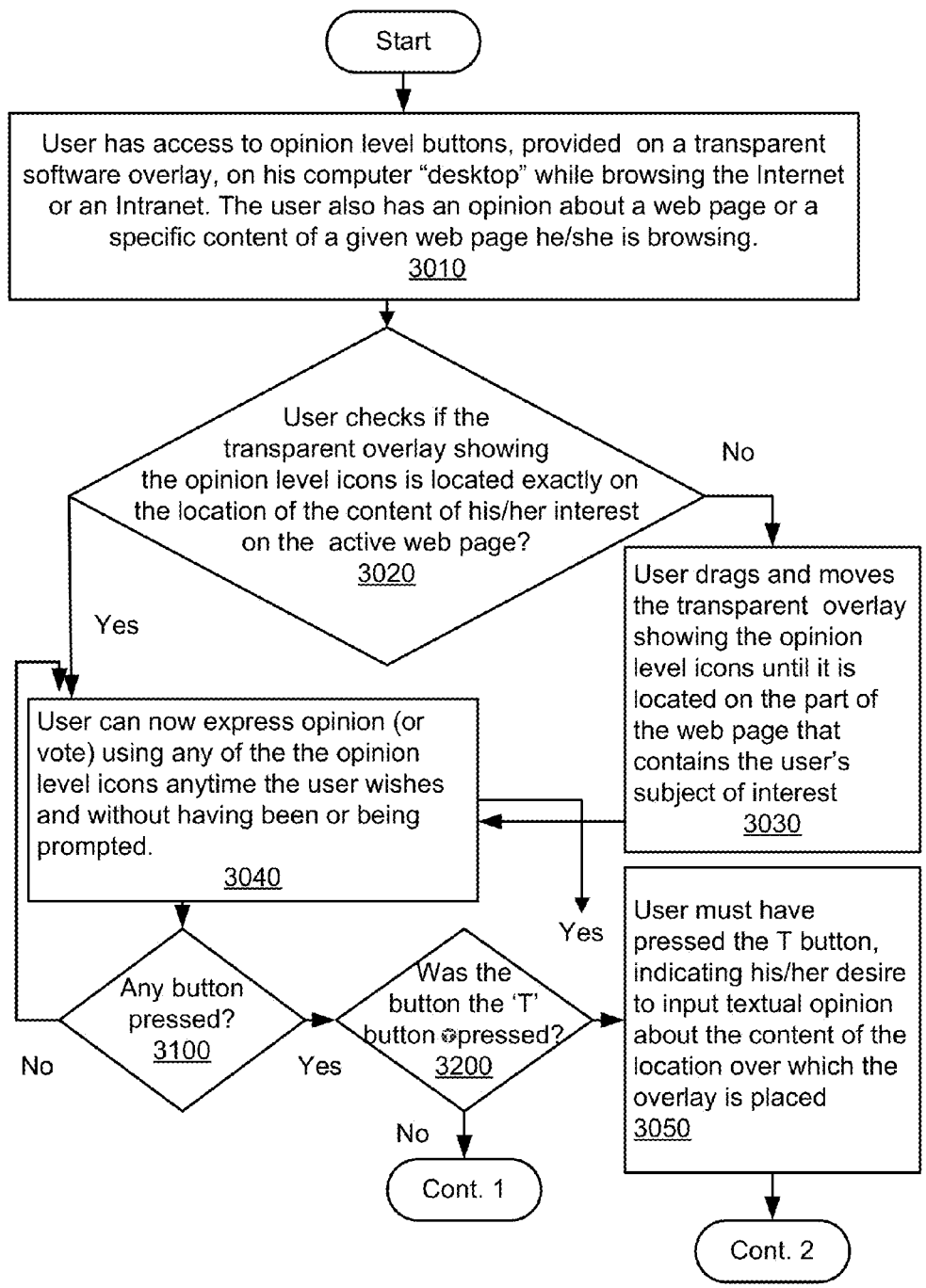
FIGS. 7a and 7b illustrate a diagram of an embodiment of the user-initiated opinion polling with a transparent graphic overlay.
Figure 7B:
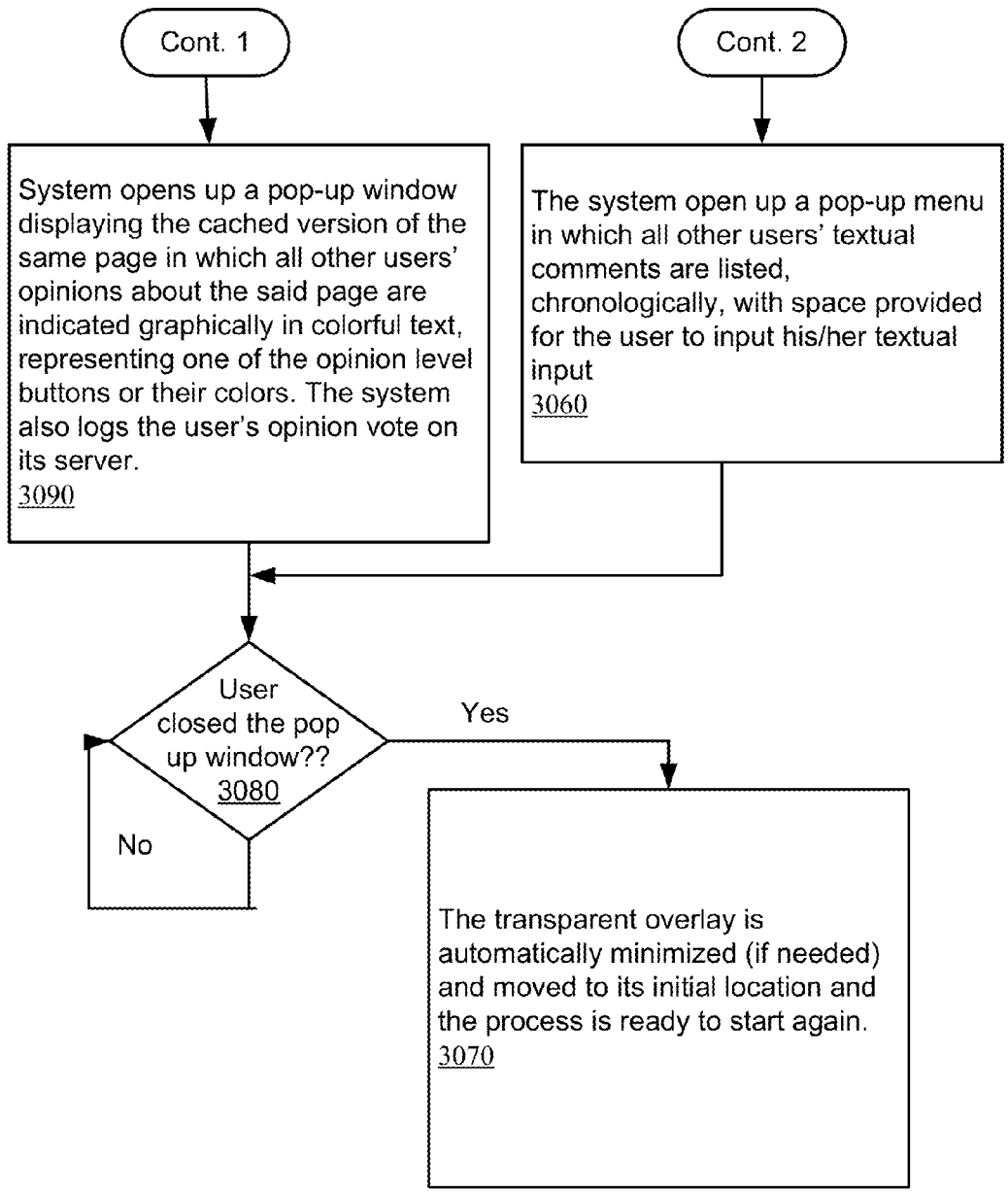
Figure 8:
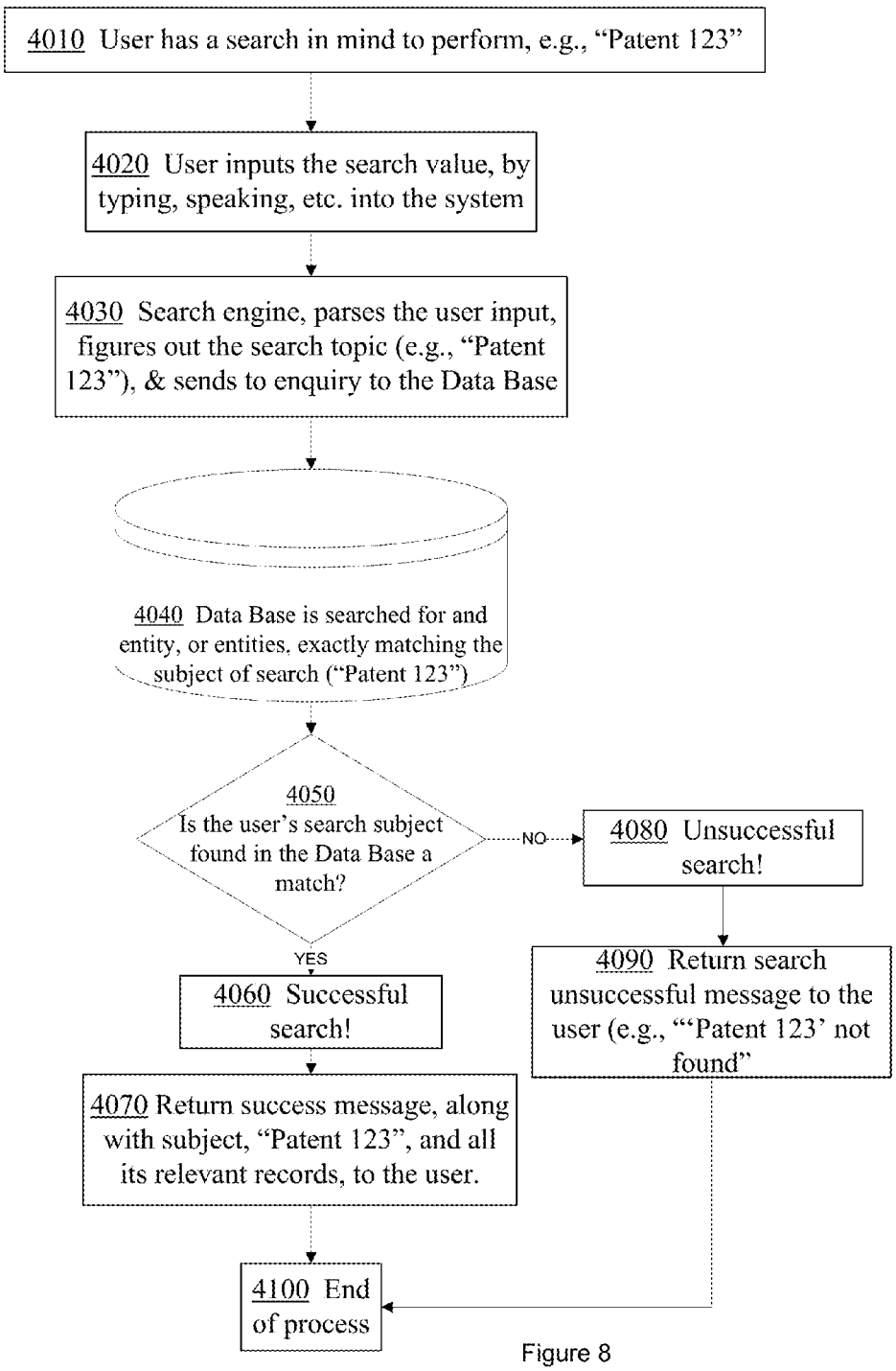
FIG. 8 illustrates a traditional search algorithm.

FIGS. 7a and 7b illustrate a diagram of an embodiment of the user-initiated opinion polling with a transparent graphic overlay. The user of a personal computer, a laptop or any other device that runs a browser or browser-like software able to access the world wide web, or any localized web-type network, is provided a small transparent desktop browser overlay displaying the buttons: ☹ ☺ ☺ ⑩ ✪ . The said overlay automatically works in conjunction with a web server on the World Wide Web (or the local network). The user can select and the drag and move the overlay to anywhere over an active web page (being browsed) in order to initiate the process of expressing/registering his/her opinion on, or to input textual comments about, the content of the specific location of the active web page on which the overlay is located at the time. The "T" ✪ button (or one similar) will perform at least 3 functions: 1) it opens a pop-up window in which comments, made by other users about the specific location of the active web-page (stored on the server in the world wide web) are listed chronologically, 2) enables the user to add a new text-based comment which is then automatically sent to and subsequently stored on the server on the world wide web, and 3) provides the user, in the new pop-up type window, a visual access to all the one-click ☹ ☺ ☺ ⑩ opinion data, charts, graphs, etc. of other prior users who have expressed opinions before. The logical flow chart for the user expressing opinion device is provided in FIGS. 7A and 7B.

In step 3010, the user has access has to ☹ ☺ ☺ ⑩ ✪ (or similar) buttons, that are provided on a transparent software overlay, on his/her computer "desktop", or other device on which he can browse, while browsing the Internet or an Intranet. The user also has an opinion about a web page or a specific content of a given web page (e.g., a text, a picture, a video clip, a diagram, etc.) he/she is browsing. The transparent overlay software, which may be running in the background, always calculates, and therefore "knows", the position on the user's computer or device "desktop" it is, and was last, located.

In step 3020, the user checks if the transparent overlay showing the opinion level buttons "☹ ☺ ☺ ⑩ ✪" is located exactly on the location of the content of his/her interest on the active web page being browsed.

In step 3030, the user selects, drags, and then moves the transparent overlay showing the opinion level buttons "☹ ☺ ☺ ⑩ ✪" until it is located on the part of the web page that contains the user's subject of interest (about which the user wants to express an opinion). This part of the web page could be text, graphics, video, a link or any other valid web content.

In step 3040, once the transparent overlay showing the opinion level buttons "☹ ☺ ☺ ⑩ ✪" is located on the content of the web page that is of the user's interest, the user can at any time, so long as the overlay has not been moved to a new location, express an opinion using the buttons that are available on the overlay. The system, automatically calculates and reads the location of the overlay as well as the content of the web page under it; therefore, any user opinions expressed can be appropriately tagged with the correct and necessary information and sent to the server on the world wide web using the format expressed in section "Opinion Voting/Voicing Device Communication Format" of this document.

In step 3050, when the system detects the user has pressed the 'T' ✪ button, indicating the user's desire to express an opinion textually, the system will perform the functions described in the following section, 3060.

In step 3060, the system performs multiple tasks, such as, but not limited to the following: 1) it opens a pop-up window in which comments, made by other users about the specific location of the active web-page (stored on the server in the world wide web) are listed chronologically, 2) enables the user to add a new comment which is then automatically sent to and subsequently stored on the server on the world wide web, and 3) provides the user, in the new pop-up type window, a visual access to all the one-click ☹ ☺ ☺ ⑩ opinion data, charts, etc. of other prior users who have expressed opinions before.

In step 3070, the transparent overlay containing the opinion level buttons "☹ ☺ ☺ ⑩ ✪" is automatically "minimized", if needed, and/or moved back to the initial position on the user's computer or device "desktop" it had prior to this particular session of the user's expressing his/her opinion about a specific part of the active web page.

In step 3080, the transparent overlay containing the opinion level buttons "☹ ☺ ☺ ⑩ ✪" will remain where it is until the user moves it (by an action such as clicking and dragging it) to a new location or "closes" it indicating the user is done with this session of expressing his/her opinion about a web page content.

In step 3090, the system opens up a pop-up window displaying the server version of the same web page, that is automatically obtained over the Internet/Intranet by the system, in which all other users' opinions to date about the said page are indicated, graphically and/or in colorful text representing the opinion level buttons "☹ ☺ ☺ ⑩ ✪" clicks. Representation of the historical opinion click data may take different graphical/textual formats (e.g., histograms, charts, bars, iconic, etc.), selectable by the user in real time or as set in his/her profile should he have one. The system also logs the user's opinion vote on its server, aggregating its database with the new opinion cast by the current user.

In step 3100, for as long as non of the opinion level buttons ☹ ☺ ☺ ⑩ ✪ are pressed or the transparent overlay is not moved to a new location, the user can express his/her opinion, like/dislike, about the location of the web page on which the overlay is located. The software responsible for the overlay operation is constantly checking for buttons pressed, or overlay moved or not.

In step 3200, upon detecting a given opinion level button (any of ☹ 😐 ☺ ⑩ 😀 ) pressed by the user, the overlay software performs different tasks depending on whether the pressed button is one of the four graphical like/dislike buttons (i.e., ☹ 😐 ☺ ⑩ ) or the button "T" 😀 indicating the user's desire to input textual opinion or like/dislike comment. The system therefore checks for the button type so that the appropriate action(s) is/are taken depending the button that was pressed.

In an embodiment, the software used to facilitate the protocol and algorithms associated with the process can be embodied onto a machine-readable medium. A machine-readable medium includes any mechanism that stores information in a form readable by a machine (e.g., a computer) but not transitory signals. For example, a machine-readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein. Any portion of the server implemented in software and any software implemented on the client device are both stored on their own computer readable medium in an executable format.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These routines, algorithms, etc. may be written in a number of different programming languages. Also, an algorithm may be implemented with lines of code in software, configured logic gates in software, or a combination of both. The applications and algorithms may be scripted in any number of software program languages.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While some specific embodiments of the invention have been shown, the invention is not to be limited to these embodiments. For example, Hardware logic, such as Boolean logic gates, may be used to implement the same functions as software coding and vice versa. Also, combinations of logic and software may be used to implement the modules and algorithms herein. The invention is to be understood as not limited by the specific embodiments described herein, but only by scope of the appended claims.

The invention claimed is:

1. An apparatus for one or more public-initiated opinion polls, comprising:
    a software server resident on a computing device configured to communicate over a network with an application resident on a client device, where the software server is configured to present one or more screens, pages, or data otherwise intended for the application resident on the client device, which the one or more screens, pages, or data are displayed on a display screen of the client device, where the software server is configured in a search field to receive a search query from the application resident on the client device regarding the one or more public-initiated opinion polls stored in a database; where the software server is configured to cooperate with the database;
    where the software server has a search module configured to complement, in response to the search query, both i) a 'Search' function to read existing data in the database and ii) an 'Add' function to write new data entries into the database, where the search module on the software server has an engine configured to parse content of the search query in the search field from the application resident on the client device and then figures out a topic of a first public-initiated opinion poll based upon the supplied content of the search query, and then sends an inquiry based on the search query to the database, where a search algorithm of the search module is configured to search the database for i) an entity, ii) two or more entities, and iii) any combination of the two, that exactly or approximately semantically matches the content of the search query;
    where the search module of the server is configured to write the new data entry on the topic of the search query in the database when a search result is not found in the database to exactly or semantically match the content of the search query, such that in subsequent searches the topic will exist; the search module is configured to both i) read and return the existing data in the database in response to the search query when the data is currently stored in the database and ii) to write the new data entry into the database in response to the search query when the topic was not previously stored in the database; thereby, modifying or enhancing the database based upon the search module's search of data entries in the database, where any portion of the software server implemented in software is stored on one or more non-transitory computer readable mediums in an executable format and any software implemented on the client device is stored on its own one or more non-transitory computer readable mediums in an executable format.

2. The apparatus of claim 1, wherein the new data entry for the topic of the first public-initiated opinion poll of the unsuccessful search is stored along with metadata obtained with that search query, which the metadata includes a geographic location of the client device sending the search query, and an IP address of the client device.

3. The apparatus of claim 1, where the application resident on the client device is one of a smart phone application or a web browser that presents a template for the first public-initiated opinion poll to allow greater specificity and user customizing of the content of the search query for the first public-initiated opinion poll supplied by the user initiating this opinion poll, and the application resident on the client device has a user interface coded to present a subject field.

4. The apparatus of claim 3, wherein the application resident on the client device is configured to present a template with one or more fields for the first opinion poll on the display screen of the client device, and where application is configured to communicate the content entered into the fields of the user interface regarding the first opinion poll over the network to the server, and the software server takes in the details of the first opinion poll, and a backend server aggregates an opinion level expressed by activating an opinion level button with all of the cast opinion levels previously submitted by users of different client machines on this opinion poll and feeds this information back to the client device to be displayed on the display screen of the client device.

5. An apparatus, comprising:
a software server resident on a computing device is configured to communicate over a network with a client application resident on a network appliance, where the client application is configured to present one or more screens, pages, or data otherwise intended to be displayed on a display screen for a user of the network appliance, where the software server is configured to enable the user of the client application to create and convey opinions on a public-initiated opinion poll to express 1) likes, 2) dislikes or 3) any combination of the two, as well as to further elaborate on an opinion by entering text, or other graphical inputs, about anything, anyone, anywhere, anytime; where the software server has a geographic module to geographically verify both a location of the client application and a location attribute of a geographic location associated with a topic of the public-initiated opinion poll, where the software server is configured to cooperate with the client application on the network appliance that cooperates with a tracking module on the client application that tracks the geographic location of the client application to supply the client application's geographic location to the software server, where the software server couples i) the client application's configured ability to allow the user to create or convey actions for the opinion poll to ii) the geographic location of the client application at a time of the action, requiring that the geographic location of the client application and the location attribute of the geographic location associated with the topic of the public-initiated opinion poll match within a defined proximity, or else disallowing the user of the client application from taking a specific action in regards to contributing to opinions, reviews, polls, surveys, and ratings on the opinion poll, which guarantees no one, other than people at the location attribute of the geographic location associated with the topic of the public-initiated opinion poll can participate in the surveys, ratings, and writing reviews about that opinion poll associated with that location attribute; where any portion of the client application implemented in software on the network appliance is stored on a non-transitory computer readable medium in an executable format and any portion of the software server implemented in software on the computing device is stored on its own one or more non-transitory computer readable mediums in an executable format.

6. The apparatus of claim 5, where the geographic module is also configured to optionally associate a GPS coordinate to an opinion topic, where each topic of opinion has a GPS coordinate assigned to it, and the computing device is a hardware server, the network is the Internet, and the network appliance is a smart phone.

7. The apparatus of claim 5, where the software server is configured to recognize content in a subject field supplied by the client application as choosing and setting a subject matter of the opinion poll, where the content of the subject field is solely initiated and decided by the user and not pre-selected by a third party and then presented to the user of the client application to give their opinion about that pre-selected subject matter of the opinion poll, where a user interface and the subject field are configured to enable the user of the client application to select an overall subject and even specific features of that subject, which the user wishes to create the opinion poll on, where the software server is configured to enable the user of the client application to choose when to express his/her opinion, exactly about what subject matter to express his/her opinion on, and then to express his/her opinion level by activating/pressing a single opinion level button that has a very specific meaning.

8. An apparatus for one or more public-initiated opinion polls, comprising:
a software server resident on a computing device configured to communicate over a network with a client application resident on a network appliance, where the client application is configured to receive an input from a machine-read code in a field from a code reading application on the network appliance, where the machine-read code regards a first public-initiated opinion poll of the one or more polls; where the software server is configured to cooperate with a database; where the database has both a pool of assigned codes associated with their own opinion poll, a pool of blank database entries associated with reserved codes available to be associated with a future topic, where each code is unique from other codes in the pool of assigned codes and the pool of reserved codes, where the client application has a code reader module configured to facilitate quick access to an opinion topic stored in the database based on the unique code, where the code reader module is configured to change an indicated status of a code when a first code from the pool of reserved codes is assigned to its own opinion poll and would now be in the pool of assigned codes.

9. The apparatus of claim 8, where the machine-read code is in bar code format, the pool of assigned codes are also in bar code format, and the code reading application is a bar code reading application.

10. The apparatus of claim 8, where the client application communicates any content entered into fields of a user interface of the client application regarding the first public-initiated opinion poll over the network to the software server, and the server is configured to take in any details of the first public-initiated opinion poll, and a backend server is configured to aggregate an opinion level expressed by activating an opinion level button with all of any cast opinion levels previously submitted by users of different client machines on this opinion poll and feeds this information back to the client application to be displayed on a display screen of the network appliance, where any portion of the software server implemented in software and any of the client application implemented in software are both stored on their own non-transitory computer readable medium in an executable format.

11. An apparatus for a public-initiated opinion poll, comprising:

a web service resident on a server configured to communicate over a network, including an intranet, with a client application, including a web browser, resident on a network appliance, where the web service is configured to receive an input from the client application regarding the public-initiated opinion poll; where the server is configured to cooperate with a database; where the database has both a pool of known users of the web service associated with their own web service identifier and an account at the web service along with a set of tracked actions regarding each unknown/anonymous users of the web service who are anonymous and not associated with a known account at the web service, where the web service is configured to allow the anonymous users to create opinion topics as well as express opinions on existing opinion topics, which make up the tracked actions regarding that unknown/anonymous user, where a tracking module of the web service cooperates with the database to maintain an association of the topics and opinions supplied from each anonymous user, while preserving that user's anonymity until that user decides to create an account on the web service, where the tracking module then causes the topics and opinions supplied from the anonymous user to be moved into the user's account in the database.

12. The apparatus of claim 11, where the client application communicates any content entered into fields of a webpage regarding the public-initiated opinion poll over the network to the server, and the server is configured to take in any details of the public-initiated opinion poll, and a backend server is configured to aggregate an opinion level expressed by activating an opinion level button with all of any cast opinion levels previously submitted by users of different network appliances on this opinion poll and feeds this information back to the client application to be displayed on a display screen of the network appliance, where any portion of the software server implemented in software and any of the client application implemented in software are both stored on their own non-transitory computer readable medium in an executable format.

* * * * *